(12) United States Patent
Vignat et al.

(10) Patent No.: US 11,609,546 B2
(45) Date of Patent: Mar. 21, 2023

(54) SYSTEMS AND METHODS FOR VIRTUAL ENVIRONMENT FOR REINFORCEMENT LEARNING IN MANUFACTURING

(71) Applicants: D.P. TECHNOLOGY CORP., Camarillo, CA (US); L'INSTITUT POLYTECHNIQUE DE GRENOBLE, Grenoble (FR)

(72) Inventors: Frederic Vignat, Grenoble (FR); Rafael Magalhaes, Grenoble (FR); Luc Manzetti, Montpellier (FR)

(73) Assignee: HEXAGON TECHNOLOGY CENTER GMBH

( * ) Notice: Subject to any disclaimer, the term of this patent is extended or adjusted under 35 U.S.C. 154(b) by 168 days.

(21) Appl. No.: 17/092,118

(22) Filed: Nov. 6, 2020

(65) Prior Publication Data
US 2021/0132580 A1    May 6, 2021

Related U.S. Application Data

(60) Provisional application No. 62/931,709, filed on Nov. 6, 2019.

(51) Int. Cl.
*G05B 19/406*    (2006.01)
*G05B 19/4065*   (2006.01)
(Continued)

(52) U.S. Cl.
CPC ....... *G05B 19/4065* (2013.01); *G05B 19/402* (2013.01); *G06N 20/00* (2019.01);
(Continued)

(58) Field of Classification Search
CPC .............. G05B 19/4065; G05B 19/402; G05B 2219/33099; G05B 2219/36266;
(Continued)

(56) References Cited

U.S. PATENT DOCUMENTS 10,295,986 B2 *   5/2019   Saitou .................... G06N 20/00
10,921,774 B2 *   2/2021   Matsumura .......... G05B 19/404
(Continued)

FOREIGN PATENT DOCUMENTS

EP    3151069    *  2/2020
JP    6608879    *  11/2019

OTHER PUBLICATIONS

International Search Report and Written Opinion for PCT/US20/59540, dated Feb. 4, 2021.

*Primary Examiner* — Hien D Khuu
(74) *Attorney, Agent, or Firm* — Concept IP LLP; Pejman Yedidsion

(57) ABSTRACT

Systems, devices, and methods including: receiving, by an interpreter component having a processor with addressable memory, a first state of a tool of a computer numerical control (CNC) machine; determining, by the interpreter component, a reward and a value of the reward based on the received first state, where the reward is at least one of: positive and negative; transmitting, by the interpreter component, a set of information comprising the determined reward and the value of the reward to an agent component; performing, by the agent component, at least one action to generate a tool path and to proceed to a second state, where the second state is combined with the first state; and determining, by the agent component, the generated tool path based on the determined reward and value associated with the at least one action.

15 Claims, 21 Drawing Sheets

(51) Int. Cl.
G06N 20/00 (2019.01)
G05B 19/402 (2006.01)

(52) U.S. Cl.
CPC .............. *G05B 2219/33099* (2013.01); *G05B 2219/36266* (2013.01); *G05B 2219/37228* (2013.01)

(58) Field of Classification Search
CPC .......... G05B 2219/37228; G05B 19/18; G05B 2219/35097; G06N 20/00; G06N 3/006; G06N 3/08; G06N 7/005
USPC ........................................................ 700/175
See application file for complete search history.

(56) References Cited

U.S. PATENT DOCUMENTS

| | | | |
|---|---|---|---|
| 2017/0031328 A1* | 2/2017 | Sawada ................. | G05B 19/401 |
| 2017/0087654 A1* | 3/2017 | Abe ......................... | B23H 7/20 |
| 2017/0151618 A1* | 6/2017 | Shirai ..................... | G06N 20/00 |
| 2018/0181108 A1 | 6/2018 | Nagano | |
| 2018/0210431 A1* | 7/2018 | Tong ..................... | G05B 13/027 |
| 2019/0033839 A1* | 1/2019 | Kuwabara ........... | G05B 19/4183 |

* cited by examiner

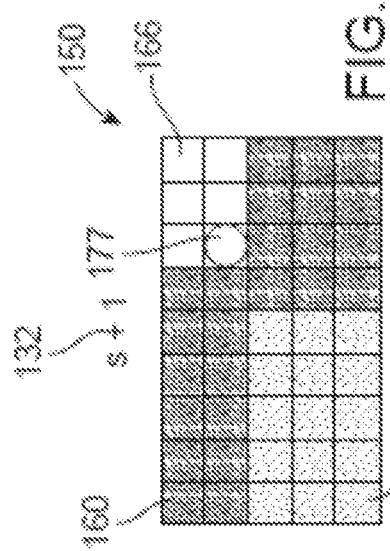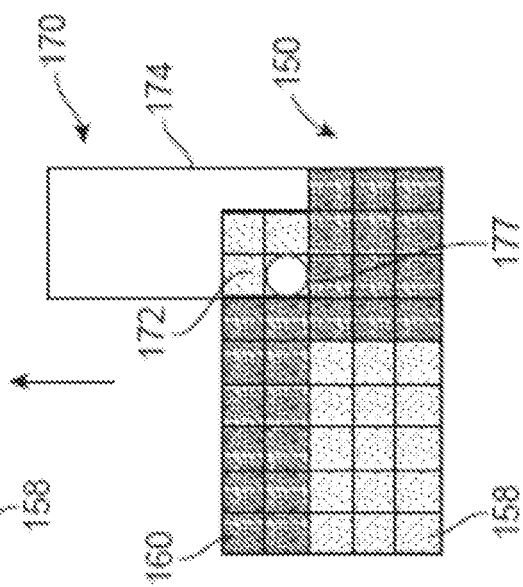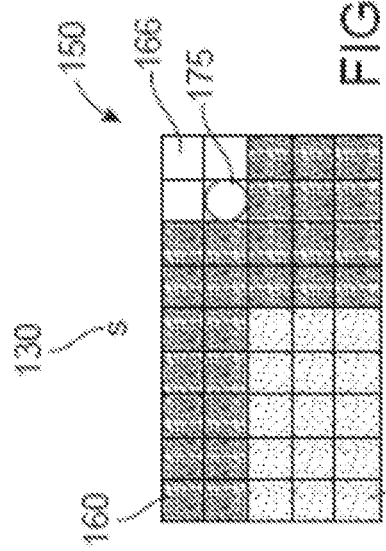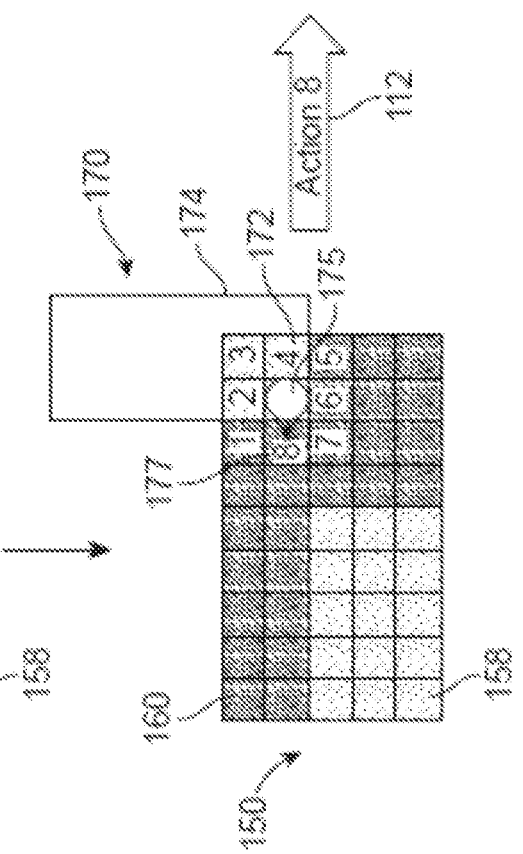

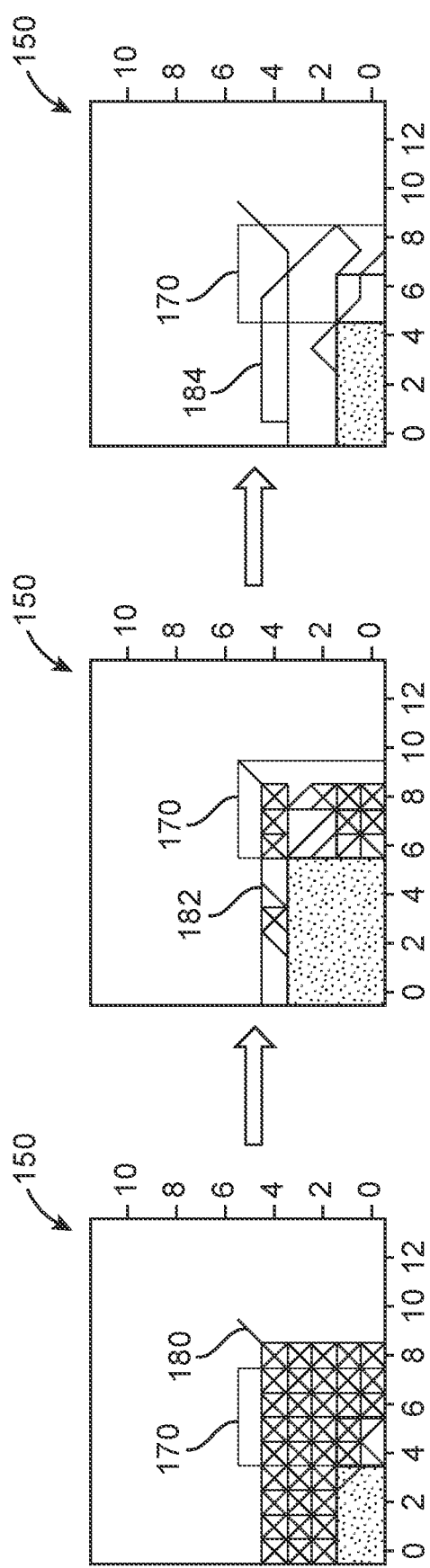

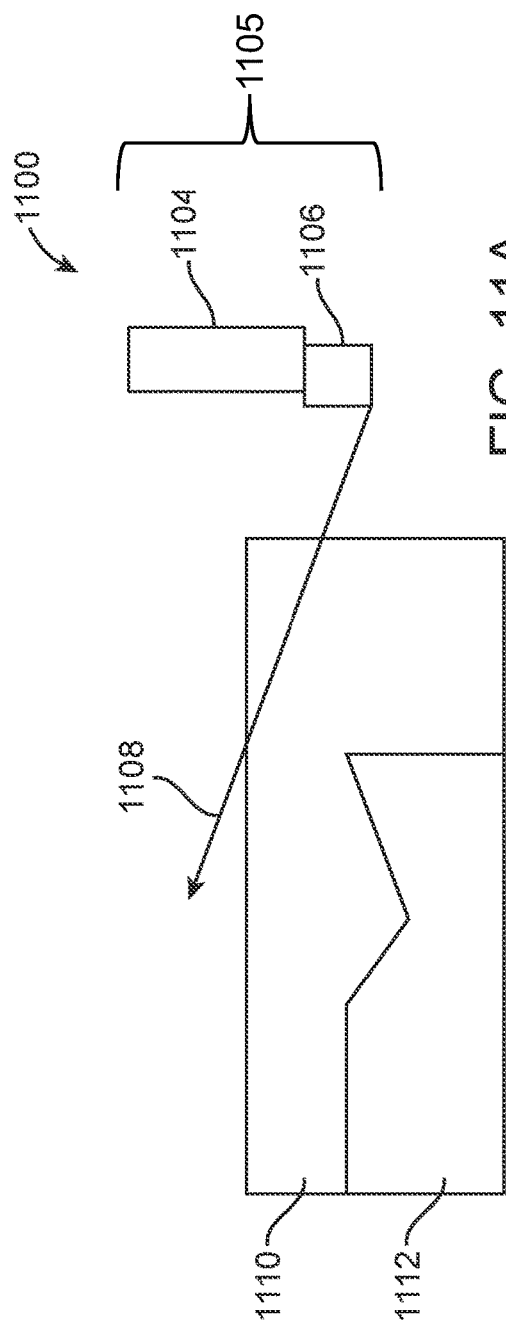
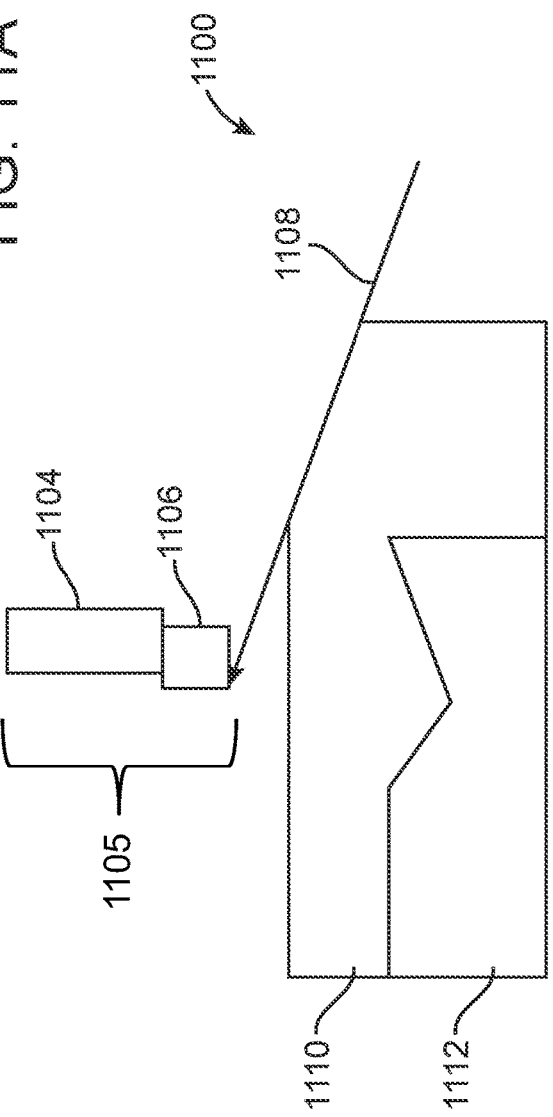

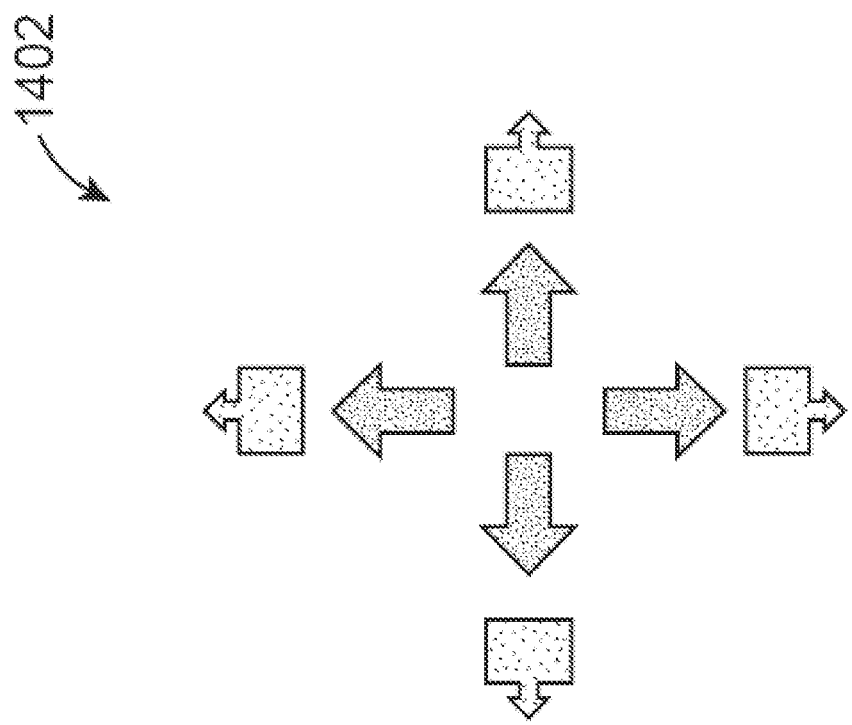
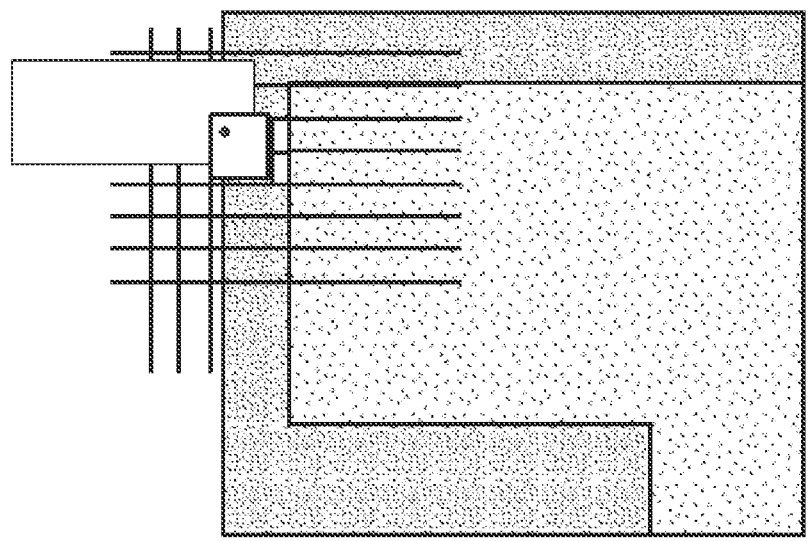
FIG. 14B

SYSTEMS AND METHODS FOR VIRTUAL ENVIRONMENT FOR REINFORCEMENT LEARNING IN MANUFACTURING

CROSS-REFERENCE TO RELATED APPLICATIONS

This application claims priority to and the benefit of U.S. Provisional Patent Application No. 62/931,709, filed Nov. 6, 2019, the contents of which are hereby incorporated by reference herein for all purposes.

TECHNICAL FIELD

Embodiments relate generally to machining processes in manufacturing, and more particularly to a virtual environment for reinforcement learning in machining processes.

BACKGROUND

Computer aided manufacturing (CAM) software systems are used to program computer numerical control (CNC) machine tools that are used in machine shops for the production of discrete parts, such as molds, dies, tools, prototypes, aerospace components and more.

CNC machine tools run a machining program that executes a series of instructions that are steps for the manufacturing of a part. CNC machine tools execute a machining program with no knowledge of the context. Execution of the program is sequential with a very short sight on the future and without a global overview of the processes.

SUMMARY

A method embodiment may include: receiving, by an interpreter component having a processor with addressable memory, a first state of a tool of a computer numerical control (CNC) machine; determining, by the interpreter component, a reward and a value of the reward based on the received first state, where the reward may be at least one of: positive and negative; transmitting, by the interpreter component, a set of information comprising the determined reward and the value of the reward to an agent component; performing, by the agent component, at least one action to generate a tool path and to proceed to a second state, where the second state may be combined with the first state; determining, by the agent component, the generated tool path based on the determined reward and value associated with the at least one action; and where the at least one action may be determined based on at least one of: changing the tool, moving the tool, turning a spindle on, and turning the spindle off.

In additional method embodiments, the first state comprises information regarding at least one of: state of the cutting tool, state of the machine, and both state of the cutting tool and state of the machine making up an overall system. In additional method embodiments, the overall system may be represented by at least one of: a cutting insert, a discrete part, a cutting tool, and a stock material. In additional method embodiments, the at least one action comprises at least one of: turning operations, milling operations, additive Directed Energy Deposition (DED), wire Electrical discharge machining (EDM), and an additive powder bed. In additional method embodiments, the at least one action may be part of a sequence of actions that are used to generate a toolpath.

A computing device embodiment may include a processor and memory, the computing device configured to: receive, by an interpreter component of the computing device, a first state of a tool of a computer numerical control (CNC) machine; determine, by the interpreter component, a reward and a value of the reward based on the received first state, where the reward may be at least one of: positive and negative; transmit, by the interpreter component, a set of information comprising the determined reward and the value of the reward to an agent component of the computing device; perform, by the agent component, at least one action to generate a tool path and to proceed to a second state, where the second state may be combined with the first state; determine, by the agent component, the generated tool path based on the determined reward and value associated with the at least one action; and where the at least one action may be determined based on at least one of: changing the tool, moving the tool, turning a spindle on, and turning the spindle off.

In additional computing device embodiments, the first state comprises information regarding at least one of: state of the cutting tool, state of the machine, and both state of the cutting tool and state of the machine making up an overall system. In additional computing device embodiments, the overall system may be represented by at least one of: a cutting insert, a discrete part, a cutting tool, and a stock material. In additional computing device embodiments, the at least one action comprises at least one of: turning operations, milling operations, additive Directed Energy Deposition (DED), wire Electrical discharge machining (EDM), and an additive powder bed. In additional computing device embodiments, the at least one action may be part of a sequence of actions that are used to generate a toolpath.

A computer-aided manufacturing (CAM) system embodiment of a computer numerical control (CNC) machine may include an interpreter component and an agent component; where the interpreter component may be configured to: receive a first state of a tool of the CNC machine; determine a reward and a value of the reward based on the received first state, where the reward may be at least one of: positive and negative; transmit a set of information comprising the determined reward and the value of the reward to the agent component; and where the agent component may be configured to: perform at least one action to generate a tool path and to proceed to a second state, where the second state may be combined with the first state; determine the generated tool path based on the determined reward and value associated with the at least one action; and where the at least one action may be determined based on at least one of: changing the tool, moving the tool, turning a spindle on, and turning the spindle off.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 8A depicts a virtual state vector space in a first state;

FIG. 8B depicts a virtual cutting tool inserted into the virtual state vector space of FIG. 8A;

FIG. 8C depicts an example of an action to move the virtual cutting tool of FIG. 8B from one state to another state within virtual state vector space of FIG. 8A;

FIG. 8D depicts the virtual state vector space of FIG. 8A in a second state after the action;

FIG. 9A depicts an example of different tool paths for cutting of a virtual stock with a virtual cutting tool;

FIG. 9B depicts an example of alternative tool paths for cutting of a virtual stock with a virtual cutting tool;

FIG. 9C depicts an example of alternative tool paths for cutting of a virtual stock with a virtual cutting tool;

FIGS. 11A-11B depict another embodiment of a system for a virtual environment for reinforcement learning in manufacturing utilizing a vector environment;

FIG. 14B depicts magnet actions for a system for a virtual environment for reinforcement learning in manufacturing;

DETAILED DESCRIPTION

Figure 1:
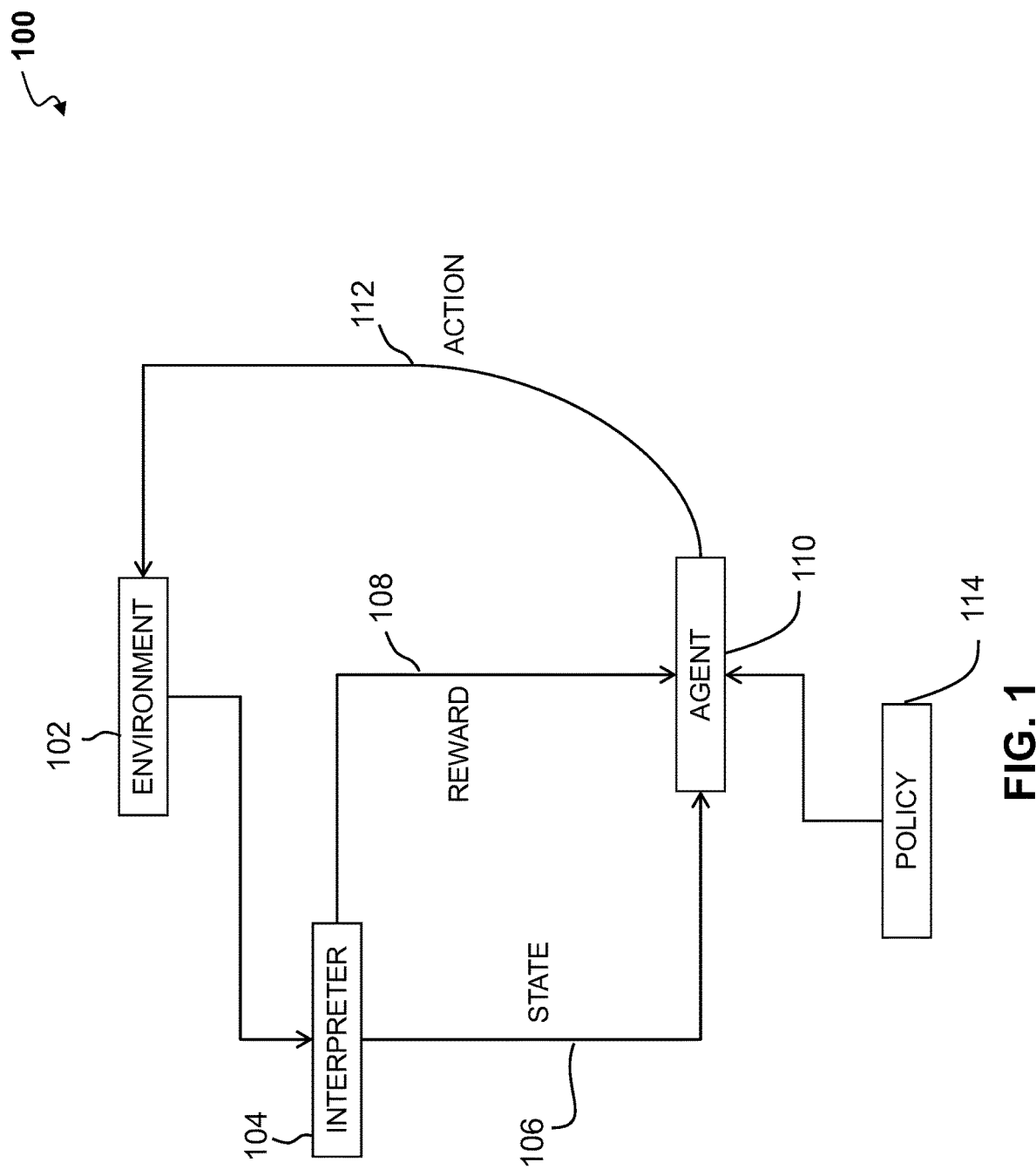
FIG. 1 depicts a system for a virtual environment for reinforcement learning in manufacturing.

The described technology concerns one or more methods, systems, apparatuses, and mediums storing processor-executable process steps of training of manufacturing machinery within a virtual environment for reinforcement learning in manufacturing. The training of manufacturing machinery may include computer aided manufacturing (CAM) software systems, which are used to program computer numerical control (CNC) machine tools. The CNC machine tools may be used in machine shops for the production of discrete parts such as molds, dies, tools, prototypes, aerospace components and more. The techniques introduced below may be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIGS. 1-14 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

With respect to FIG. 1, a system 100 for a virtual environment for reinforcement learning in manufacturing (VOM) is illustrated. The virtual environment for reinforcement learning in manufacturing system 100 provides for intelligently automating machine operations and production of discrete parts, such as molds, dies, tools, prototypes, aerospace components and more. Generally speaking, reinforcement learning is an area of machine learning for taking an appropriate action to maximize reward in a particular situation. In one embodiment, the system 100 may execute a series of instructions that are steps for finding the best possible behavior or "path" that a machine should take in a particular situation, such as production of a machine tool. In one embodiment, the best possible behavior may include the shortest possible tool path. In another embodiment, the best possible behavior may include or be based on the shortest possible tool path with a force not passing above a certain threshold force limit, while also minimizing the machine acceleration (or staying within a certain temperature range in the case of a Directed Energy Deposition or DED additive). With the disclosed system 100, a reinforcement agent component decides what steps to perform for a given task. In one embodiment, there may be an absence of a training dataset, so the system 100 may be bound to learn from the system's 100 own experience and history, e.g., hysteresis defined by the dependence of the state of a system on its history.

In one embodiment, the system 100 may include a virtual environment 102, a vector type representation of an environment state 106, a (limited) number of actions to perform by an action component 112, a vector type representation of the actions, an interpreter component 104, a policy component 114, an agent component 110, and a reward 108 of a reward system. In one embodiment, the state 106 may be a representation of the virtual environment 102. In one embodiment, the state 106 may be a matrix of pixels representing the virtual environment 102. In one embodiment, the matrix may have the same number of rows and columns. In another embodiment, the matrix may have a different number of rows and columns. The pixels of the state 106 may represent a certain part of the virtual environment 102, such as a cutting insert, a discrete part, a cutting tool, stock material, and the like. In another embodiment, the pixels of the state 106 may represent some combination of parts of the virtual environment 102, such as the cutting tool and the stock material. In yet another embodiment, the pixels of the state 106 may represent all parts of the virtual environment 102. In one embodiment, the policy component 114 may deliver a policy to the agent component 110 which may include data for what actions 112 are possible. Examples of actions 112 which may be determined by the agent component 110 based at least on the policy component 114 include, for example, avoiding a collision and/or avoiding a part violation. The agent component 110 may take actions in the virtual environment 102, which may be interpreted by the interpreter component 104 into a reward 108 and a representation of the state 106, which may be fed back to the agent component 110. In one embodiment, the interpreter component 104 may evaluate and determine if the reward 108 is to be negative or positive (as well as a value for each reward 108), based on what has been learned as well as the policy in place. The interpreter component 104 then relays the reward 108 and the state 106 to the agent component 110. More specifically, the rewards 108 of the system 100 may include two types of reinforcement—positive and negative. The system 100 learns through positive reinforcement, such that when an event occurs due to a particular behavior, the system 100 seeks to increase the strength and the frequency of the behavior. This positive effect on the behavior of the system 100 may, for example, lead to repeating positive steps, which help to maximize performance of the machine. Conversely, negative reinforcement may provide for strengthening of a behavior since a negative condition is stopped or avoided.

The agent component 110 may interact with the virtual environment 102 in discrete time steps. For example, at each time t, the agent component 110 may receive an observation, which typically includes the reward 108. The agent component 110 may then choose an action 112 from a set of a limited number of actions. In one embodiment, the action 112 may be based on what has already been learned by the agent component 110 as well as the policy. Examples of actions which may be determined based on the policy include, for example, avoiding a collision and/or avoiding a part violation. The action 112 may be subsequently sent to the virtual environment 102 by the agent component 110. The virtual environment 102 may move to a new state and the reward 108 may be determined. In one embodiment, the goal of the agent component 110 is to collect as many rewards 108 as possible. In one embodiment, the agent component 110 may choose any action as a function of the history of the process. In another embodiment, actions may be chosen randomly by the agent component 110. Therefore, the system 100 may function on a trial and error basis, where the system 100 continually improves in efficiency due to receiving rewards based on positive actions. Examples of negative rewards when machining via a tool in virtual space may include operating at a temperature above a desired temperature and/or operating at a force that is determined to be too high, for example, cause damage. In both instances, no cutting or improper cutting of or by the tool may take place due to the high force and high temperature, thus a negative reward is given any time no cutting or improper cutting of the tool occurs at a given step. Conversely, when proper cutting occurs, each action may yield a positive reward. That is, the system 100 may learn to cut the stock (or add the material) in a more efficient manner based on the reward system in place that represents the know-how of the company.

Figure 2:
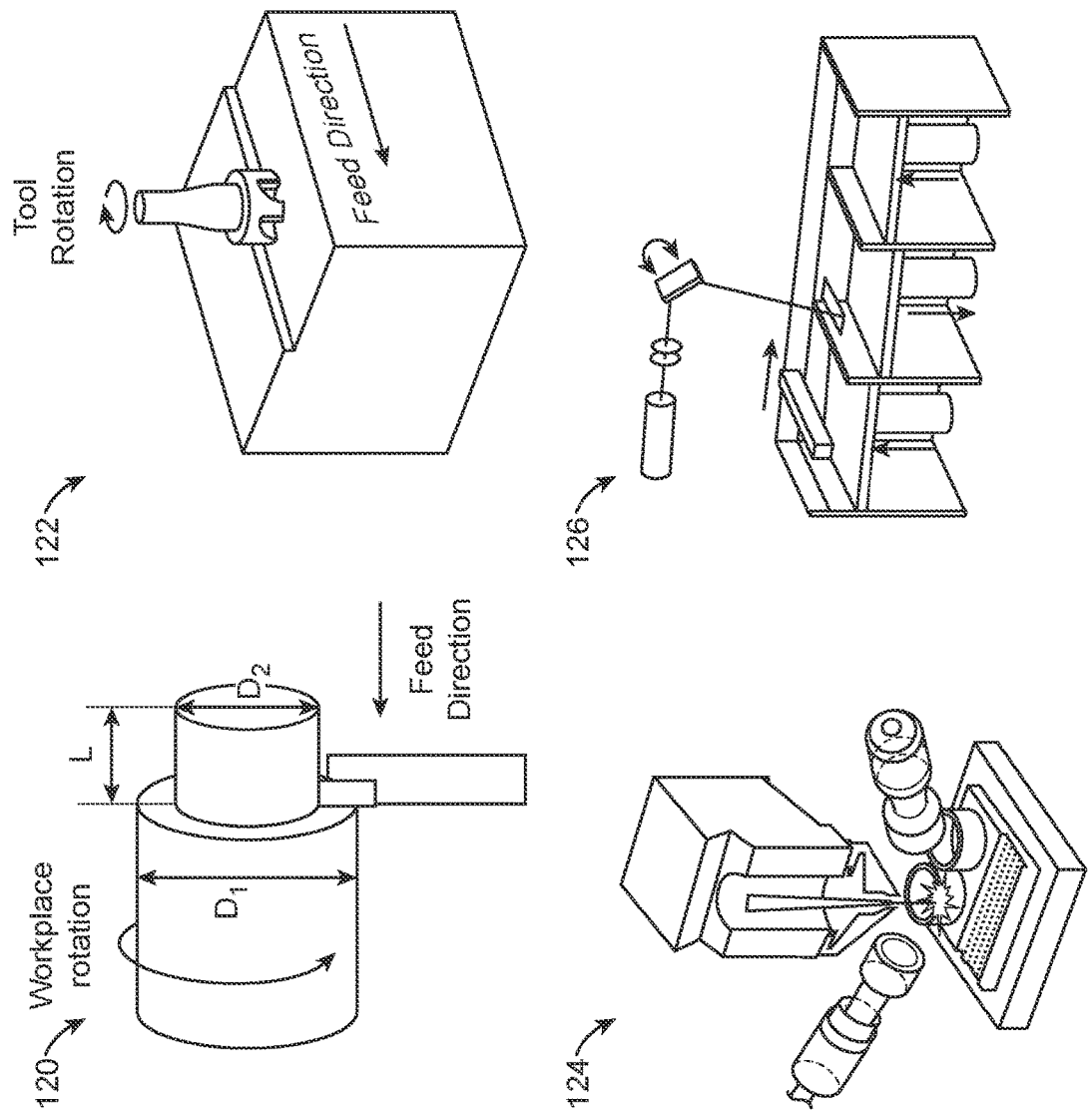
FIG. 2 depicts the system of FIG. 1 as based on elementary manufacturing operations.

With respect to FIG. 2, the system of FIG. 1 as applied to elementary manufacturing operations is illustrated. For example, the system may be based on such elementary manufacturing operations as "tool move", "tool change", "spindle on", "arc on", and the like. The system may be adapted to manufacturing operations including but not limited to turning operations 120, milling operations 122, additive DED 124, wire Electrical discharge machining (EDM), and an additive powder bed 126. The agent component 110 of the system may be based on machine learning algorithms, including an artificial neural network (ANN), X-GBoost, decision trees, genetic algorithms, and the like, in order to learn how to choose the best series of actions to go from an initial state to a final state with the best performance. In one embodiment, the best series of action are the ones that maximize the total reward for a given part. This is the series of actions that maximize the performance of the machining operation. Actions that maximize performance may include but are not limited to minimal cutting time, highest quality cutting, no vibration, minimal machine acceleration, deposition or removal in the correct temperature range, etc.

Figure 3:
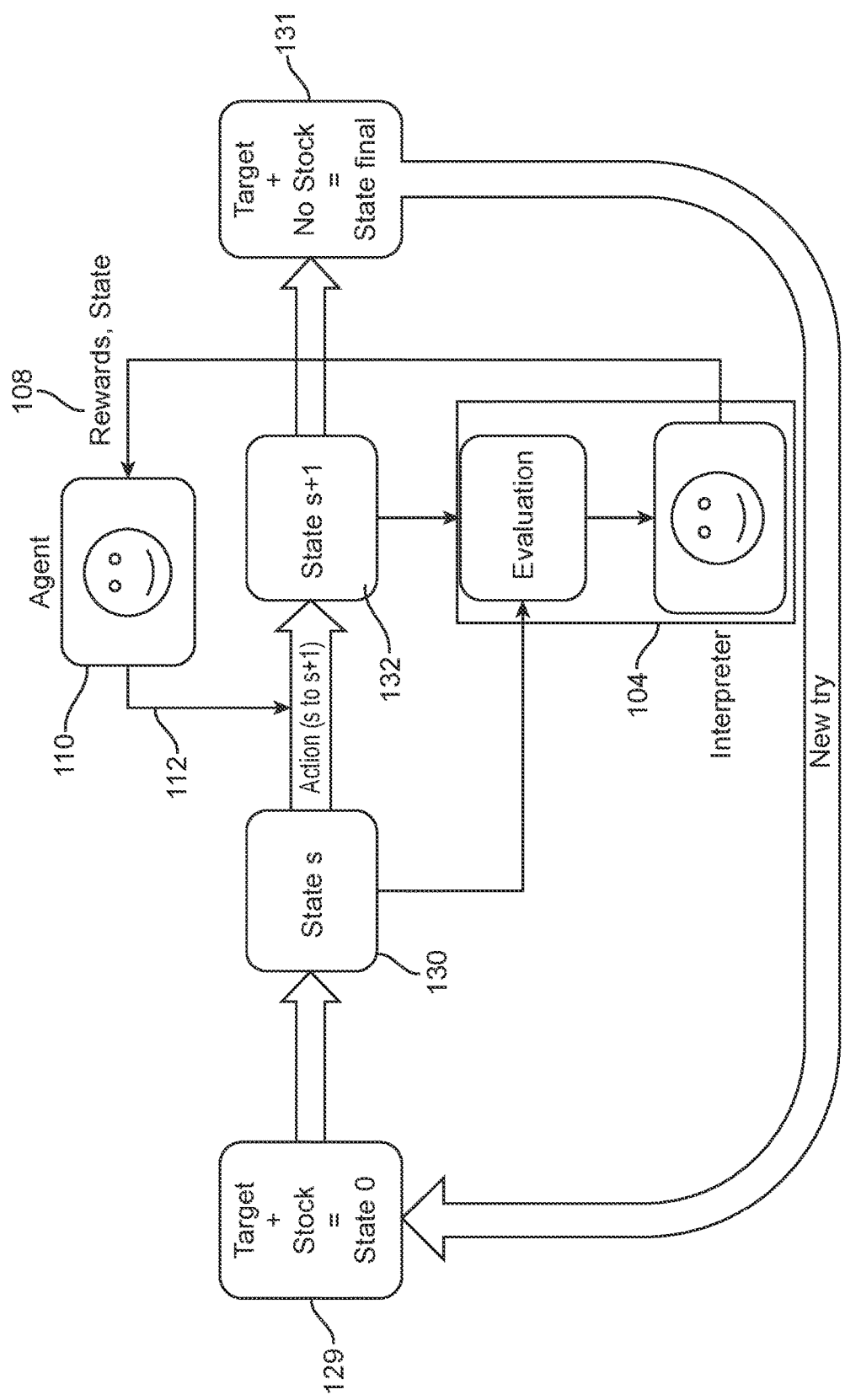
FIG. 3 depicts a process for reinforcement learning in manufacturing in the virtual environment of FIG. 1.

With respect to FIG. 3, an iterative process for a VOM system for reinforcement learning, such as the exemplary VOMs of FIG. 2 is shown. The VOM process may start at an initial state "0" 129 which is based on a virtual stock tool and a target tool representing a desired final manufactured tool, such as final virtual rendering of the stock tool. In one embodiment, the VOM proceeds to a state "s" 130, where at the first step of the iterative process s=0. At state s 130, the information regarding the state of the tool is sent to the interpreter component 104 for evaluation. At the initial state "0", no action has been carried out by the agent component 104 yet, so the information regarding the state of the tool is sent to the interpreter component 104 for evaluation indicates that no change has occurred to the virtual stock tool. In some embodiments, the interpreter component 104 evaluates and determines if the reward 108 is to be negative or positive (as well as a value associated with the reward) based on what has been learned as well as the policy in place, which may determine what actions 112 are possible. The interpreter component 104 may then relay the reward 108 (positive or negative along with a value, if available) and the state 130 back to the agent component 110. The agent component 110 may perform an action 112 to proceed to a new state "s+1" 132. The VOM may have a number of possible actions 112 to perform from states s 130 to state s+1 132, such as changing a tool, moving a tool, turning a spindle on, and turning a spindle off. In one embodiment, the state s+1 may be a virtual representation of the stock tool after the actions 112 were performed on the virtual stock tool. For example, the virtual stock tool at state s+1 may appear much more like the target tool after the actions were performed between states s and s+1, resulting in a positive reward. The state s+1 132 (combined with the original state s 130) is then sent to the interpreter component 104 for evaluation. Again, the interpreter component 104 relays the reward 108 (positive or negative along with the value, if available) and the new state back to the agent component 110. The process iterates (e.g., s+n times) until a final state 131 is reached where no stock is left to be machined, no target is empty and thus to be added, and/or the number of trials/iterations that have been performed is greater than a previously determined threshold. In one example embodiment, the number of trials performed is given as ten times the number of pixels, which represents the number of possible cuts as described in detail below. Other possible numbers of trials to be performed are possible and contemplated. After the maximum number of trials has been performed, or there is no stock remaining, the process may begin again at the initial state 129 for learning purposes until the learning is determined to be complete. In some embodiments, the agent component 110 may learn by making successive virtual machine parts until the agent component 110 succeeds with a performance valuation having a higher number than any of the previous iterations, e.g., determined based on the highest total reward received for a given part. The best performance may be defined as one that will have the highest global reward sum for a machine part. In one embodiment, the reward takes into account the performance at each step, and when the machine part is finished, a special reward may be given. For example, an extra reward may be given for the last step of the operation process.

Figure 4:
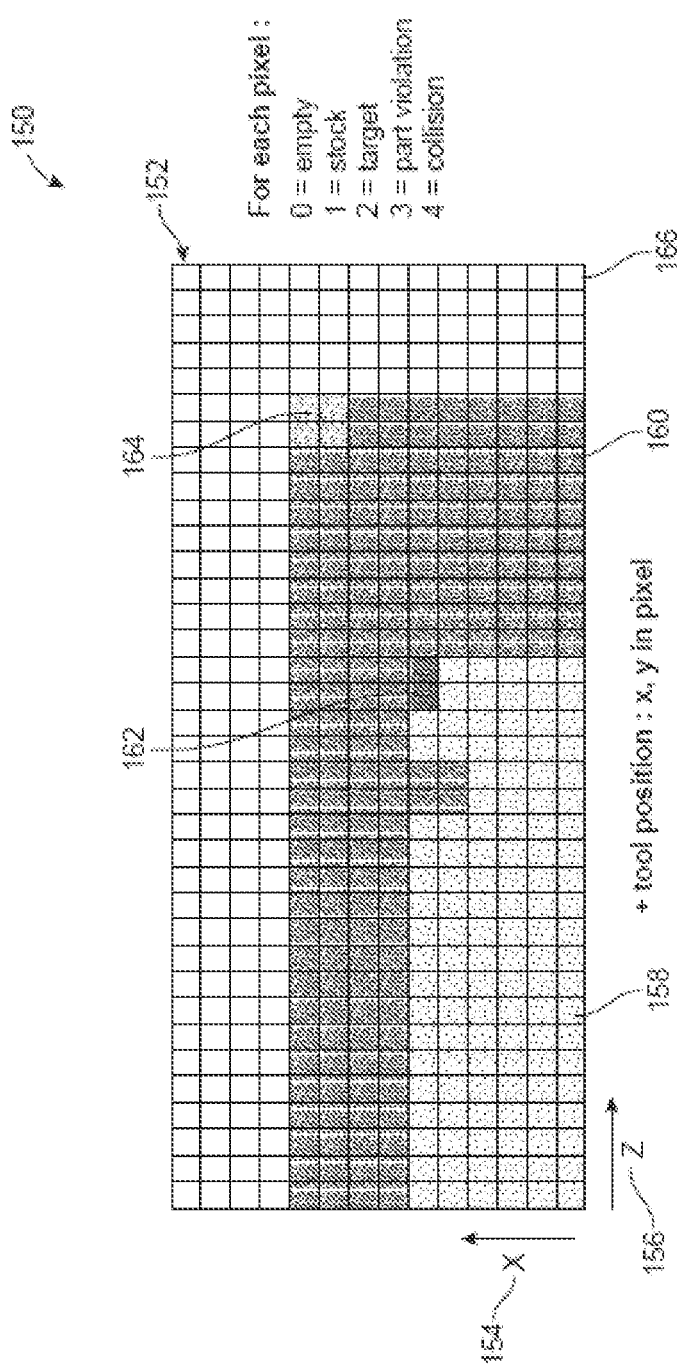
FIG. 4 depicts a pixelated vector representing a particular state in the process of FIG. 3.

With respect to FIG. 4, a state vector 150 representing a particular state in the iterative process for a VOM system for reinforcement learning is shown. In this example, a turning operation of a virtual part is shown. Other possible state vector representations are possible, such as for milling operations, additive DED operations, and additive powder bed operations. The state vector representation 150 of a virtual tool position in the VOM is shown in pixels 152 in two dimensions, such as an x-axis 154 and a z-axis 156. In another embodiment, the tool position may be shown in pixels in three dimensions, x, y, and z. The z-axis 156 represents the rotation to have the parts turning, thus providing an axis of revolution to the cut of the virtual part.

In the virtual state vector space 150, there may be at least five state vectors. First, a stock virtual vector 160 occupies pixels in the state vector space 150. Pixels 166 show the empty space around the stock pixels 160. A target part state vector 158 is shown, representing the desired position of the final part after the machining process. Pixels 162 represent a violation of the tool, for example, if the target part has occurred. Pixels 164 represent a collision between the stock and the shank of the virtual tool, such as when the shank is overlapping with the stock of the target part. In one embodiment, each state vector 158, 160, 162, 164, 166 may be represented by an integer, such as 0, 1, 2, 3, or 4. In another embodiment, each state vector 158, 160, 162, 164, 166 may be represented as a table overlain on top each of one another as a layer, where each layer represents one of the five possible state vectors.

Figure 5:
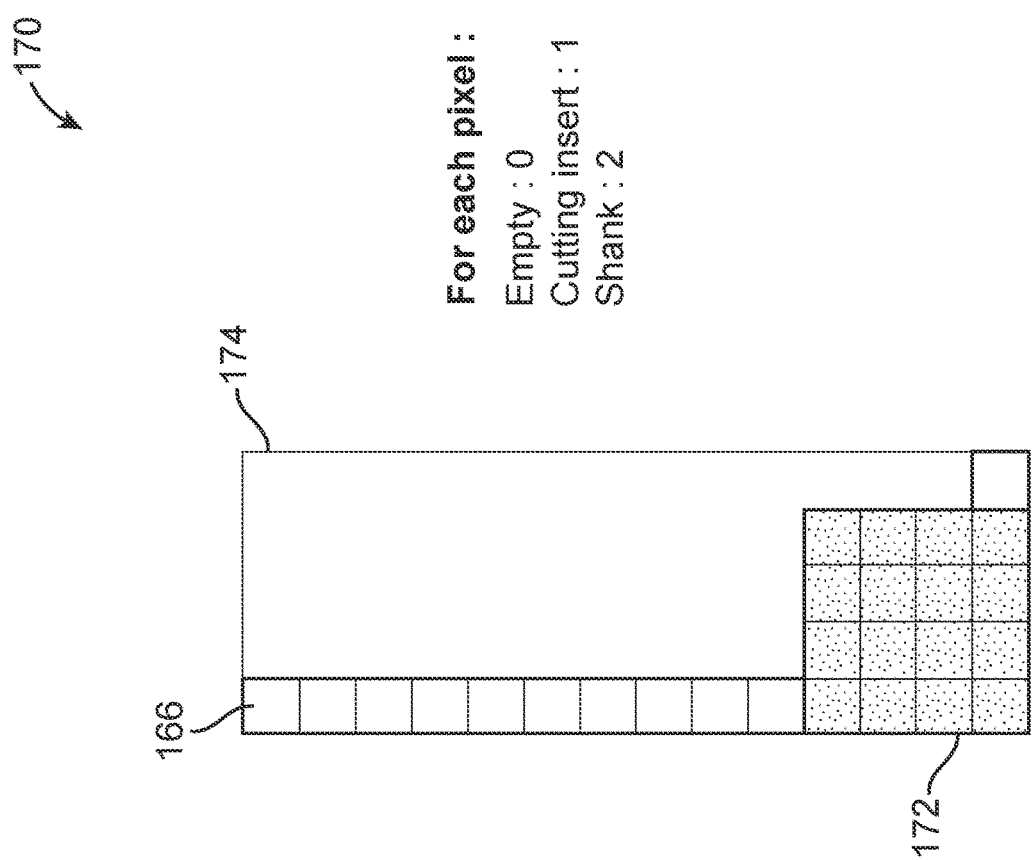
FIG. 5 depicts a pixelated vector of a virtual cutting tool.

With respect to FIG. 5, a pixelated or more particularly a pixelated vector 170 of a virtual cutting tool to be moved into the virtual vector space 150 of FIG. 4 is shown. Pixels 172 represent a cutting insert 172 that is the cutting part of the tool. Pixels 166 represent the empty space. Pixels 174 represent the shank that holds the cutting insert.

Figure 6:
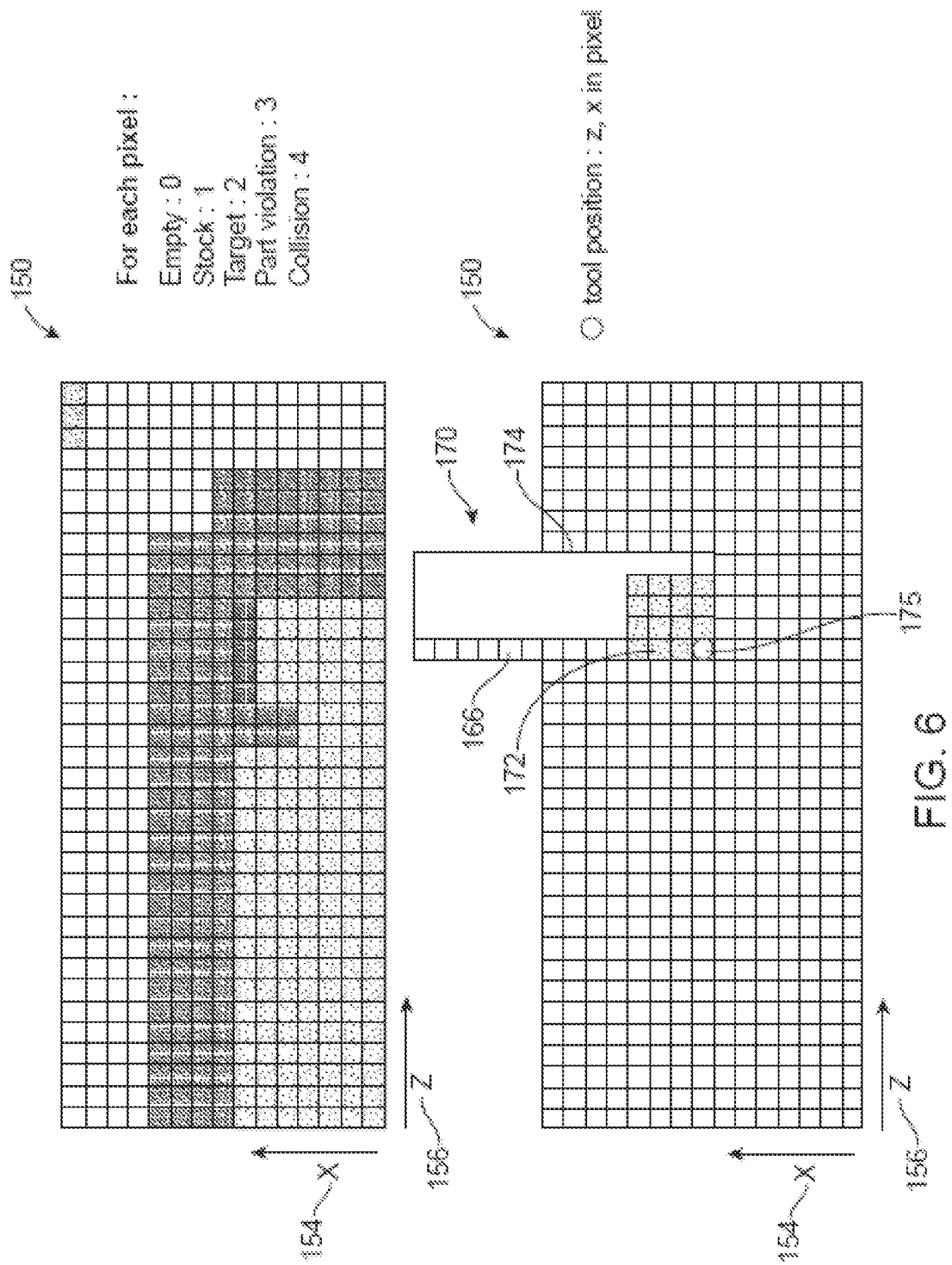
FIG. 6 depicts the pixelated vector of the virtual cutting tool of FIG. 5 to be moved into the state vector of FIG. 4.

With respect to FIG. 6, the pixelated vector of the cutting insert 172 of FIG. 5 may be moved into the virtual state vector space 150 of FIG. 4 for cutting of the stock 160 to achieve the target part state vector (FIG. 4, 158) in the most efficient manner. The position of the cutting insert 172 at a given time has a 2-dimensional x, z position 175.

Figure 7:
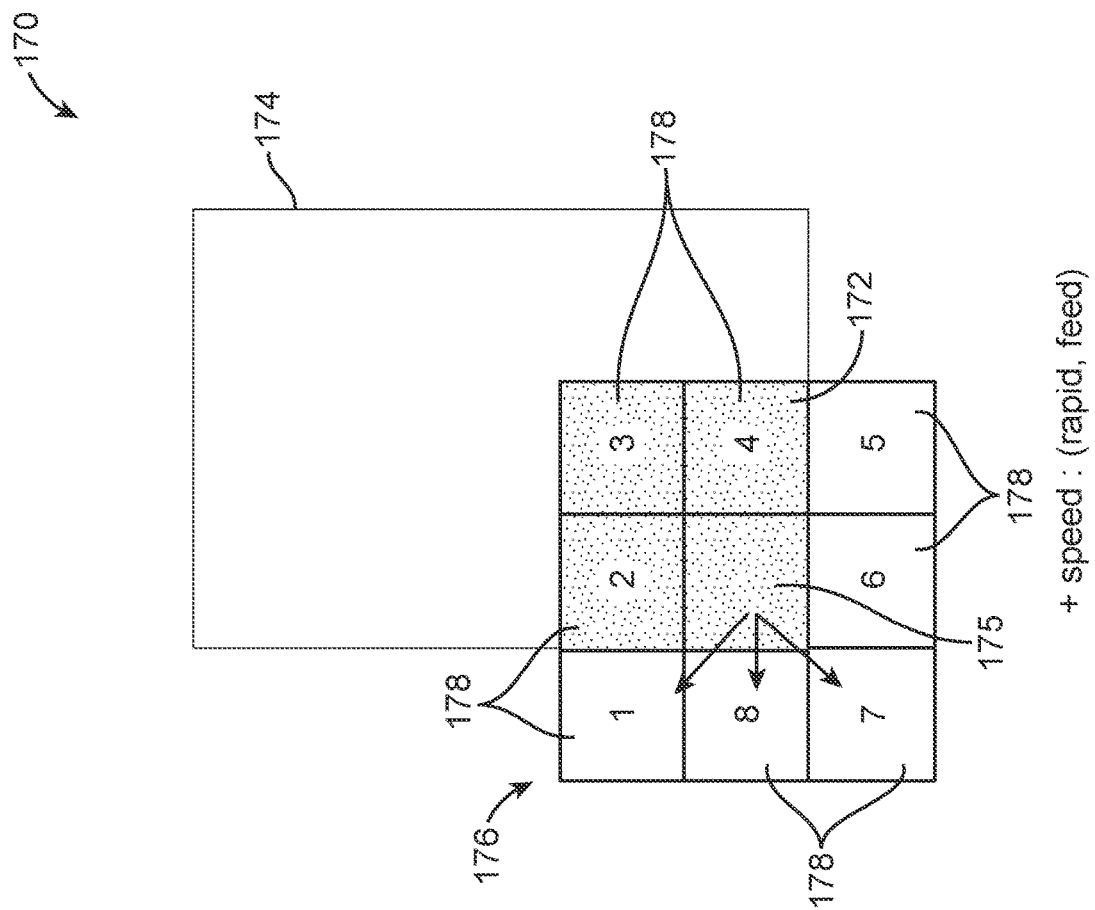
FIG. 7 depicts possible moving actions of the cutting tool of FIG. 5.

With respect to FIG. 7, moving actions 176 for the cutting insert 172 and shank 174 are shown. More specifically, from the position 175, the cutting insert 172 may move in 8 possible directions corresponding to 8 consecutive cells 178 surrounding the cutting insert position 175. In one embodiment, if the cutting insert 172 is operating in 3-dimensional space, e.g., x,y,z coordinates, then 26 movements of the cutting insert 172 may be possible. Therefore, to move from a state s (FIG. 3, 130) to a state s+1 (FIG. 3, 132), as described in possible moving actions 176 of the cutting insert in FIG. 3, the action may be to move the cutting insert 172 in a direction up and to the left, directly up, up and to the right, to the right, down and to the right, straight down, down and to the left, or to the left. Additional actions may also change the speed at which the cutting insert 172 is moving as well as the feed rate. In one embodiment, the feed rate and speed are not continuous; rather, they are drawn from a limited number of actions. Other possible actions may include changing a tool, moving a tool, turning a spindle on, and turning a spindle off.

FIGS. 8A-8D show an example of an action to move a cutting insert from a state s 130 to a state s+1 132 within a VOM system. With respect to FIG. 8A, a virtual state vector space, such as virtual state vector space 150 is illustrated. With respect to FIG. 8A, the virtual cutting tool 170 with the shank 174 and the cutting insert 172 are moved into the state vector space 150. More specifically, at state s 130 the cutting insert 172 occupies the empty space 166 of FIG. 8A. In one embodiment, at state s 130, the information regarding the state of the tool is sent to the interpreter component (FIG. 3, 104) for evaluation. The interpreter component (FIG. 3, 104) evaluates and determines the reward (FIG. 3, 108) based on the state change and the reward system. In some embodiments, the reward system reflects the best practices coming from the knowledge of practitioners, and the policy in turn is limiting the possible actions. The reward may take into account the cutting rate, force, machine dynamics, number of collisions, number of part violations, and the like. The VOM system 100 may be learning from rewards and is limited by the policy in terms of the possible actions that may be taken. More specifically, the policy is a set of fixed rules and the VOM system may not learn from the policy itself. The interpreter component (FIG. 3, 104) then relays the reward (FIG. 3, 108) (positive or negative) and the state s 130 back to the agent component (FIG. 3, 110). The agent component (FIG. 3, 110) may then perform an action (FIG. 3, 112). In one embodiment, the action may be selected randomly by the agent component (FIG. 3, 110). More specifically, during the learning phase, the selection of the action may be based on an exploration rate, such that a higher exploration rate of the parameter space leads to a higher proportion of random actions. When the learning phase is over and operations turn to an execution phase, then random actions are no longer executed. In another embodiment, the action may be based on the best estimated possible rewards for the possible actions with regards to the current state.

In further embodiments, the agent component (FIG. 3, 110) of the VOM system may be based on machine learning algorithms, such as an ANN. As described in further detailed below, learning may be based at least in part on so-called "Q-learning", where an action is chosen randomly by the agent component (FIG. 3, 110) or selected by the best "Q value" depending on the tool path exploration rate. In one embodiment, the ANN may determine the best Q value regarding the current state. The best Q value should represent the best action for the agent component (FIG. 3, 110) to select in order to obtain the highest global reward for a given tooling part. The ANN may "learn" this function (e.g., the Q value function of state) properly.

With respect to FIG. 8C, the action 112 may be to move the cutting tool 170 to the pixel at position 177 directly to the left of the initial position 175. Therefore, the cutting insert 172 will cut into the stock 160 at the adjacent pixels labeled "1" and "8", with pixel "8" located at position 177. In this embodiment, the interpreter component (FIG. 3, 104) evaluates and determines the reward (FIG. 3, 108). The interpreter component (FIG. 3, 104) then relays the reward (FIG. 3, 108) (positive or negative, as well as the reward value) and the new state (FIG. 3, 106) back to the agent (FIG. 3, 110). The agent component (FIG. 3, 110) then proceeds to the new state "s+1" 132 as shown in FIG. 8D. The process may iterate (e.g., s+n times) until a final state is reached where no stock is left to be machined or too many trials/iterations have been performed, where too many trials being determined based on a predetermined threshold.

With respect to FIGS. 9A-C, examples of different paths 180, 182, 184 for cutting a stock with a virtual cutting tool are shown. FIG. 9A has a large number of possible actions to create the path 180 with the virtual cutting tool 170, where the large number is based on a comparison with path 182 of FIG. 9B. The virtual environment for reinforcement learning 100 provides for decreasing the number of actions required based on rewards in order to decrease the overall tool path 180, thus making the process more efficient e.g., in terms of the distance the tool has to travel. For example, the number of actions in FIG. 9B for path 182 has significantly decreased as compared to FIG. 9A as the VOM has received positive rewards. The toolpath 184 has become even more efficient as shown in FIG. 9C as compared to path 180 of FIG. 9A and path 182 of 9B.

Figure 10:
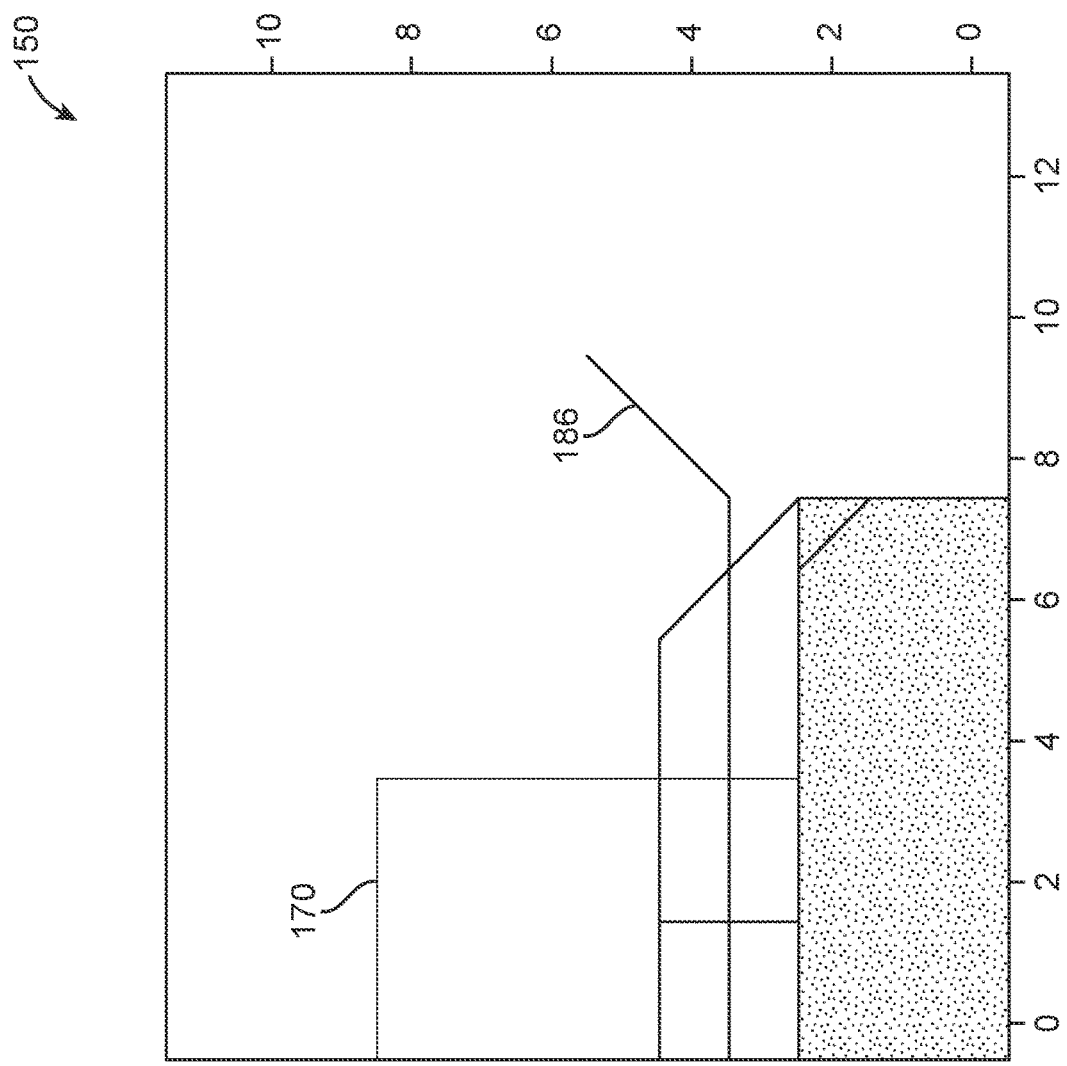
FIG. 10 depicts an optimal tool path to be executed by an agent.

With respect to FIG. 10, when the reinforcement learning process has been completed, a toolpath 186 giving the best performance may be executed by the agent (FIG. 3, 110). Learning may be based at least in part on so-called "Q-learning", where an action is chosen randomly by the agent (FIG. 3, 110) or selected by the best "Q value" depending on the tool path exploration rate. More specifically, Q-learning is a model-free reinforcement learning algorithm. The aim of Q-learning is to learn a policy, which tells the agent (FIG. 3, 110) what action to take under what circumstances. Q-learning does not require a model of the virtual environment, and may handle problems with stochastic transitions and rewards, without requiring adaptations. For any finite Markov decision process (FMDP), Q-learning finds a policy that is optimal in the sense that it maximizes the expected value of the total reward over any and all successive steps, starting from the current state. In general, Q-learning may identify an optimal action-selection policy for any given FMDP, given infinite exploration time and a partly-random policy. "Q" names the function that returns the reward used to provide the reinforcement and may be said to stand for the "quality" of an action taken in a given state. In one embodiment, the rewards system needs to ensure convergence and provide results that conform to the knowledge provided to the VOM system 100.

FIGS. 11A and 11B depict another embodiment of a system 1100 for a virtual environment for reinforcement learning in manufacturing utilizing a continuous, non-discretized, "contour-based" environment. In one embodiment, a tool path may follow a smooth trajectory, rather than a course, pixelated trajectory. For example, the environment may provide for navigation in any vector direction, allowing a cutting tool to follow real part surfaces. FIG. 11A represents the state of the machine and/or system before a cutting motion along a tool path trajectory is performed and FIG. 11B represents the state of the machine and/or system subsequent to the cutting motion. In one embodiment, at each iteration, the cutting tool may take an action and subsequently travel along a tool path trajectory to remove stock material. Then, at the next iteration, the cutting tool may take a new action (based on the previous iteration) to continue to remove stock material. Subsequent iterations continue to remove stock material until the remaining material follows the closed contour of the target material. An iteration or step-size action may be performed in a float number size, and need not be restricted to an integer step size.

In one embodiment, the codification may provide for non-discretized, smooth contour representations of the state of the virtual environment. In another embodiment, the codification may provide for a pixel matrix representations of the state of the virtual environment. In another embodiment, the system may provide for a combination of smooth and pixelated representations of the state of the virtual environment. In one embodiment, the system may provide for a plurality of options for viewing the state of the system. For example, an agent may use a pixilation view in various resolutions to have an approximate view of the actual environment state. In another example, the agent may use a 'zoom' view to enhance the view of the state of the environment. Other viewing options may also be used and are described below.

The system may include a cutting tool 1105 with a cutting tool holder 1104 and a cutting portion 1106 that travels along a tool path 1108, e.g., a trajectory of the cutting tool 1105 of a certain angle with respect to a target material 1112. The cutting portion 1106 may be used to remove material from a stock material 1110 to ultimately result in a stock material form 1110 that is identical to the target material 1112 form. In some embodiments, the system 1100 may use a continuous, non-discretized environment, abstract moves, and "diagonal parts". Abstract moves or "abstractions" may remove physical, spatial, or temporal details or attributes in the study of objects or systems to focus attention on details of greater importance. In one embodiment, the abstract moves may be related to the virtual environment's capacity to be programmed to give action options to the agent for the cutting tool to reach positions in the virtual environment without the need to precisely determine the 'fraction step size value and angle'.

In one embodiment, the diagonal parts refer to the parts with angular surfaces different from 90 degrees or 180 degrees. The non-discretized, contour-based environment allows the cutting tool to travel along any spatial vector.

More specifically, the system 1100 may hide all but the relevant data about an object, such as a stock material 1110 and a target material 1112 in order to reduce complexity, while increasing efficiency. Therefore, the abstract moves may remove irrelevant data with respect to achieving the desired outcome, e.g., the target material 1112, thereby decreasing the complexity of the codification within the virtual environment. The environment of the system 1100 may be based on closed contours of part, stock, tool shank, and tool insert. In one embodiment, at each iteration, the cutting tool 1105 travels along a tool path trajectory, such as tool path trajectory 1108 at the first iteration, to remove stock material. The system's 1100 use of the vector-free size virtual environment, abstract moves, and diagonal parts may allow the cutting tool to remove stock material to ultimately follow the closed contour of the target material 1112. The virtual environment may learn to take the fewest steps (i.e., the fewest iterations) to achieve the final target material 1112.

Figure 12:
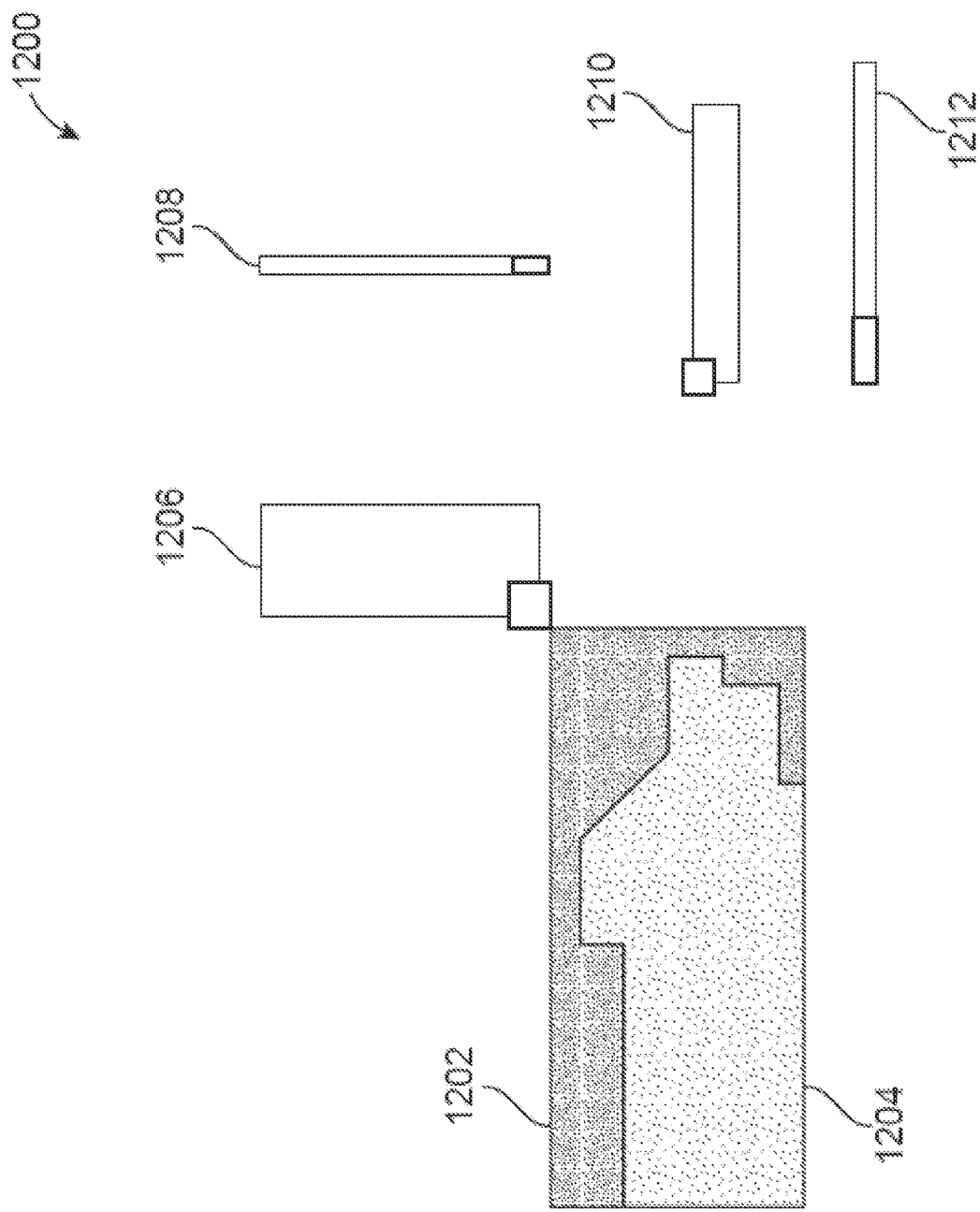
FIG. 12 depicts a system for a virtual environment for reinforcement learning in manufacturing with multiple cut tools.

FIG. 12 depicts a system 1200 for a virtual environment for reinforcement learning in manufacturing utilizing a continuous, non-discretized, "contour-based" environment with multiple cutting tools. The system 1200 may include stock material 1202 to be removed leaving the target material 1204. The system 1200 may include a number of cutting tools 1206, 1208, 1210, 1212. The cutting tools 1206, 1208, 1210, 1212 may include a regular vertical cutting tool 1206, a cut/grooving tool 1208, a regular horizontal tool 1210, and a drilling tool 1212. The system 1200 may include environment recoding to represent parts, workpieces, and cut tools in vectorial/polygonal math. In one embodiment, computations may be precisely defined with three tool move possibilities: step move, angle move, and free move. A step move is a dictionary based like up, down, left, and right. An angle move is given a degree angle and length. A free move is given any x and y length.

Figures 13A, 13B, 13C, 13D:
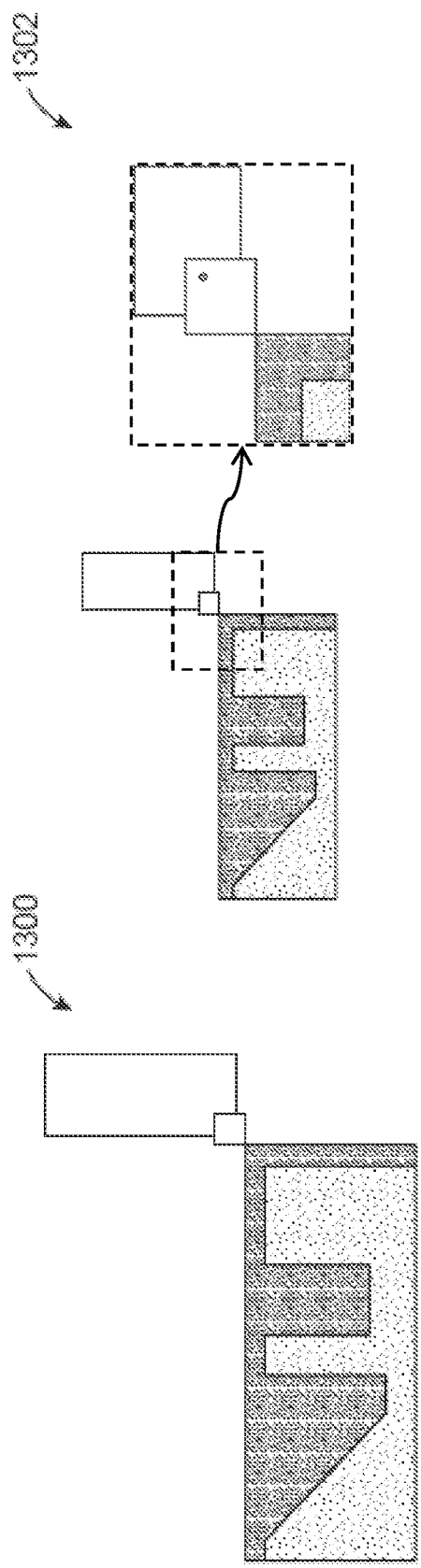
FIGS. 13A-13D depict protocols for a system for a virtual environment for reinforcement learning in manufacturing.

FIG. 13A depicts a system for a virtual environment for reinforcement learning in manufacturing representing a target material, a stock material and a cutting tool, such as those shown in FIGS. 11A-B. FIGS. 13B-13D depict "protocol views" 1302, 1304, 1306 for constructing the target material (e.g., the target part) with a system for a virtual environment for reinforcement learning in manufacturing. The first protocol 1302 generates an image with user-defined resolution combining two main aspects of the overall view, such as an environment screenshot, and a cut tool centered view, such as a zoom or enhancement in the cut insert. More specifically, the overall view (the image shown in FIG. 13A), is displayed on the left side of FIG. 13B. The dash-lined box on the left side of FIG. 13B shows where the cutting tool is inserted into the stock material and this area is enhanced in a zoomed-in view shown on the right side. In one embodiment, the agent may use both the zoomed-in view and the non-zoomed-in view to make decisions. In one embodiment, the output to feed agent is an image with changeable resolution. The enhanced view may provide for enhanced resolution, allowing the agent to make more accurate cutting decisions than the zoomed-out view.

The protocol views described above, of which an agent may use one or more of, represent the state of the virtual environment at a given iteration. The agent may use said protocol views to "reason" as to what action is to be subsequently taken. As such, the agent may use one or more protocols to examine the state of the environment and decide what action or actions need to be taken to ultimately make the stock part achieve the final shape of the target part.

The second protocol 1304 shown in FIG. 13C generates an image with user-defined resolution combining two different aspects: a cut tool centered view, such as a zoom or enhancement in the cut insert, plus a recodification based on the amount and direction where part and workpiece objects exist. The output to feed agent is an image with changeable resolution. In one embodiment, the generated image consists of a zoomed-in view, such as that of the zoomed-in view of FIG. 13B embedded in an exaggerated view of the stock material, with the stock material bordering the zoomed-in portion. The exaggerated view of the stock material allows the agent to have an approximate understanding of the total amount of stock material surrounding the enhanced view portion.

The third protocol 1306 shown in FIG. 13D generates a tabular list of content: a table with two columns representing the distance to achieve (or not to achieve) from the part object to the workpiece object. In one embodiment, the tabular list of content may be defined to generate a small codification while substantially increasing the learning process of the system for a virtual environment for reinforcement learning in manufacturing. In one embodiment, the output to feed agent is a tabular list with user-defined contents. In one embodiment, the agent is a virtual operator.

In one embodiment, each row of the tabular list of content may represent a single sector of the "radar" image shown to the left of the tabular list. For example, the row of sector 0 is a tabular representation of the sector 0 of the radar image. Each column represents the shortest distance from the center of the radar image to the part, (first column) as well as the shortest distance from the center of the radar image to the stock material (second column). More specifically, each column represents the distance from a reference point in the cutting tool to the first and nearest segment of the part polygon (first column) and the workpiece stock material polygon (second column). If there is no part or workpiece stock material polygonal segment present in a sector, then no value is inputted into the tabular list, such as for sectors 2, 3, 4, and 5. In one embodiment, the sectors allow the agent to 'see' the environment more precisely in order to take an action. In one embodiment, more than six sectors are possible. In another embodiment, less than six sectors are possible.

Figure 14A:
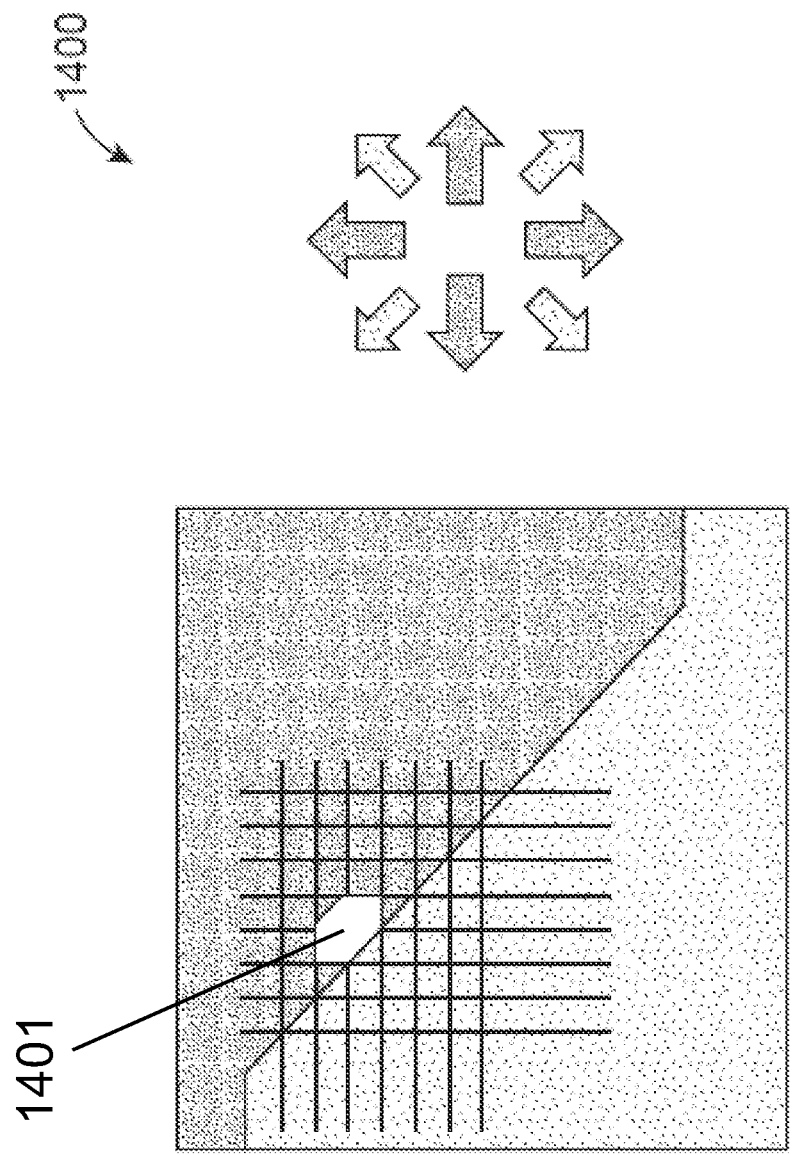
FIG. 14A depicts abstraction actions for a system for a virtual environment for reinforcement learning in manufacturing.
Figure 14C:
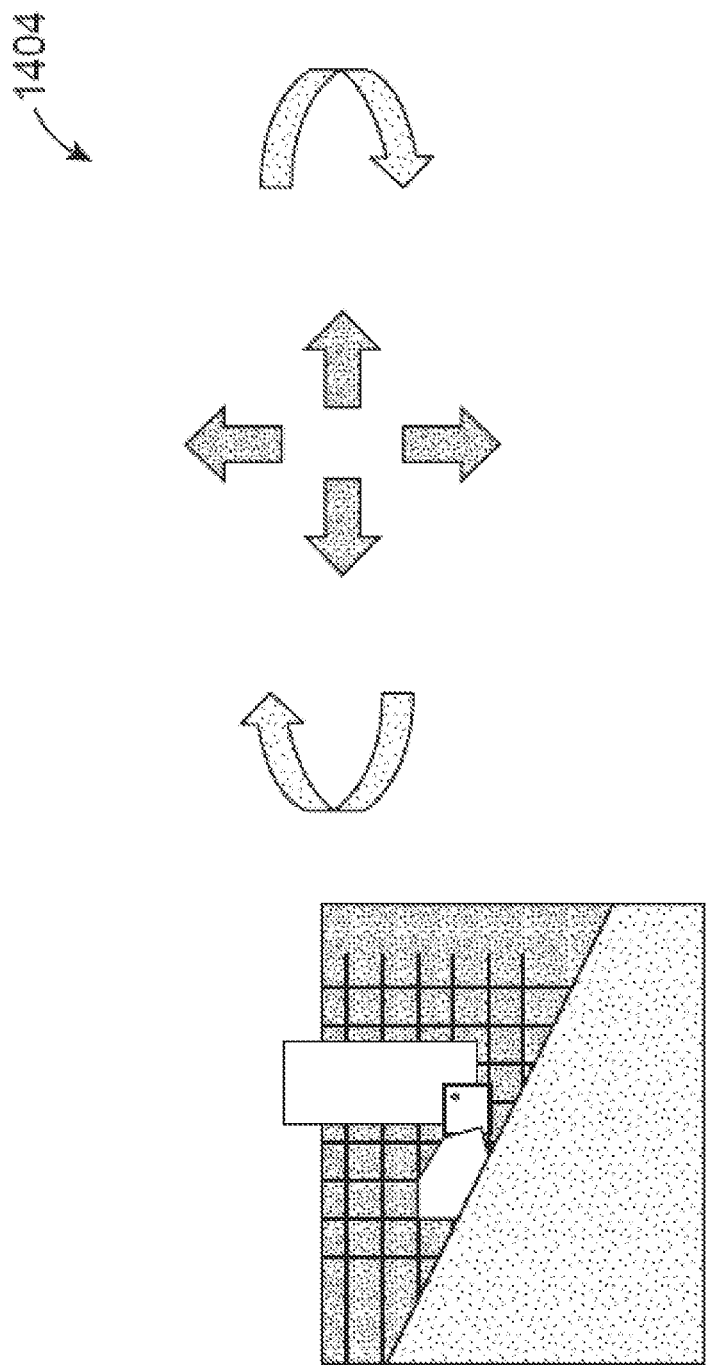
FIG. 14C depicts tracking actions for a system for a virtual environment for reinforcement learning in manufacturing.

FIG. 14A depicts abstraction actions for a system 1400 for a virtual environment for reinforcement learning in manufacturing. Abstractions may include Up (0, 1), Down (0, −1), Left (−1, 0), and Right (1, 0). Diagonals may include (−1, −1), (−1, 1), (1, 1), and (1, −1). In one embodiment, the virtual environment may have the capacity to navigate in any vector direction, allowing for the implementation real diagonal moves; therefore, the cutting tool may follow smooth, non-discretized part surfaces. For example, an area 1401 to be cut by a cutting tool may require fewer moves than a discretized, pixelated environment. With system 1400, a diagonal move may only require a single action, whereas a pixelated environment may require two moves, such as a move up then a move to the left.

FIG. 14B depicts "magnet actions" for a system 1402 for a virtual environment for reinforcement learning in manufacturing. Magnet actions may include up, down, left, and right. In one embodiment, step sizes for movement actions need not be pre-defined at a certain value. In one embodiment, the abstract moves for the system 1402 may include a 'magnetic move' wherein the agent may move the cutting tool as near as possible to the part without touching the part. In one embodiment, when a cutting tool is close to a target material, the magnet may attract the cutting tool to a target material.

In one embodiment, an agent may learn more and more complex actions using a limited number of action possibilities. In this way, an abstract move may include moving the cutting tool as the cutting tool was 'tracking' or 'following' the surface of the part to be cut. As such, the abstract move may simplify the cutting process by decreasing the number of actions available, while also allowing the actions to be more and more complex. More specifically, and with reference to FIG. 14C, a system 1404 for a virtual environment for reinforcement learning in manufacturing may have a set of tracking actions. Tracking actions may include clock or counter-clock directions for tracking a cutting tool along a contour of a target material where there are intersections between the cutting tool and target material.

Figure 15:
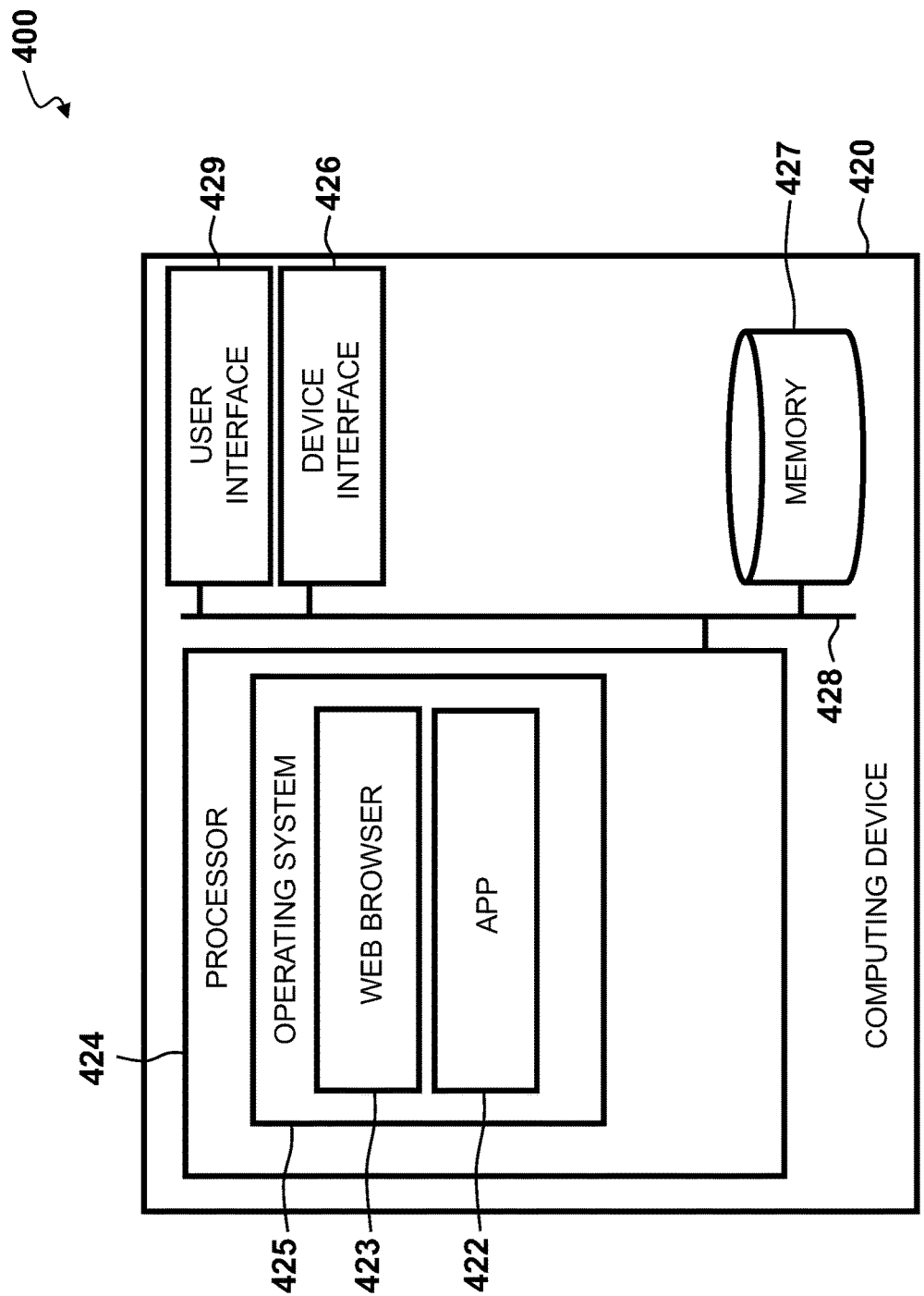
FIG. 15 illustrates an example top-level functional block diagram of a computing device embodiment.

FIG. 15 illustrates an example of a top-level functional block diagram of a computing device embodiment 400. The example operating environment is shown as a computing device 420 comprising a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 420, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 428. In some embodiments, via an operating system 425 such as one supporting a web browser 423 and applications 422, the processor 424 may be configured to execute steps of a process establishing a communication channel and processing according to the embodiments described above.

Figure 16:
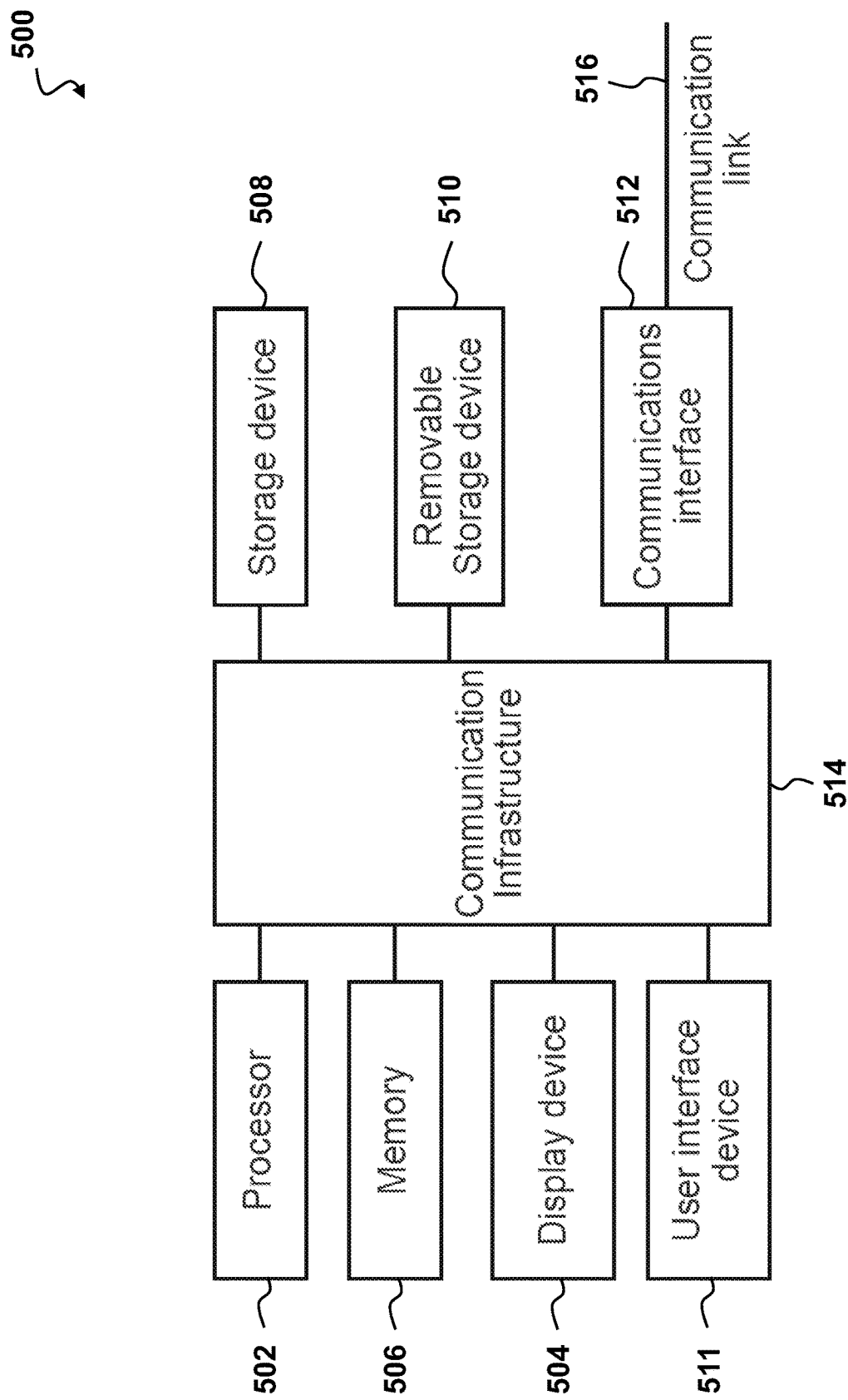
FIG. 16 shows a high-level block diagram and process of a computing system for implementing an embodiment of the system and process.

FIG. 16 is a high-level block diagram 500 showing a computing system comprising a computer system useful for implementing an embodiment of the system and process, disclosed herein. Embodiments of the system may be implemented in different computing environments. The computer system includes one or more processors 502, and can further include an electronic display device 504 (e.g., for displaying graphics, text, and other data), a main memory 506 (e.g., random access memory (RAM)), storage device 508, a removable storage device 510 (e.g., removable storage drive, a removable memory module, a magnetic tape drive, an optical disk drive, a computer readable medium having stored therein computer software and/or data), user interface device 511 (e.g., keyboard, touch screen, keypad, pointing device), and a communication interface 512 (e.g., modem, a network interface (such as an Ethernet card), a communications port, or a PCMCIA slot and card). The communication interface 512 allows software and data to be transferred between the computer system and external devices. The system further includes a communications infrastructure 514 (e.g., a communications bus, cross-over bar, or network) to which the aforementioned devices/modules are connected as shown.

Information transferred via communications interface 514 may be in the form of signals such as electronic, electromagnetic, optical, or other signals capable of being received by communications interface 514, via a communication link 516 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 512. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 17:
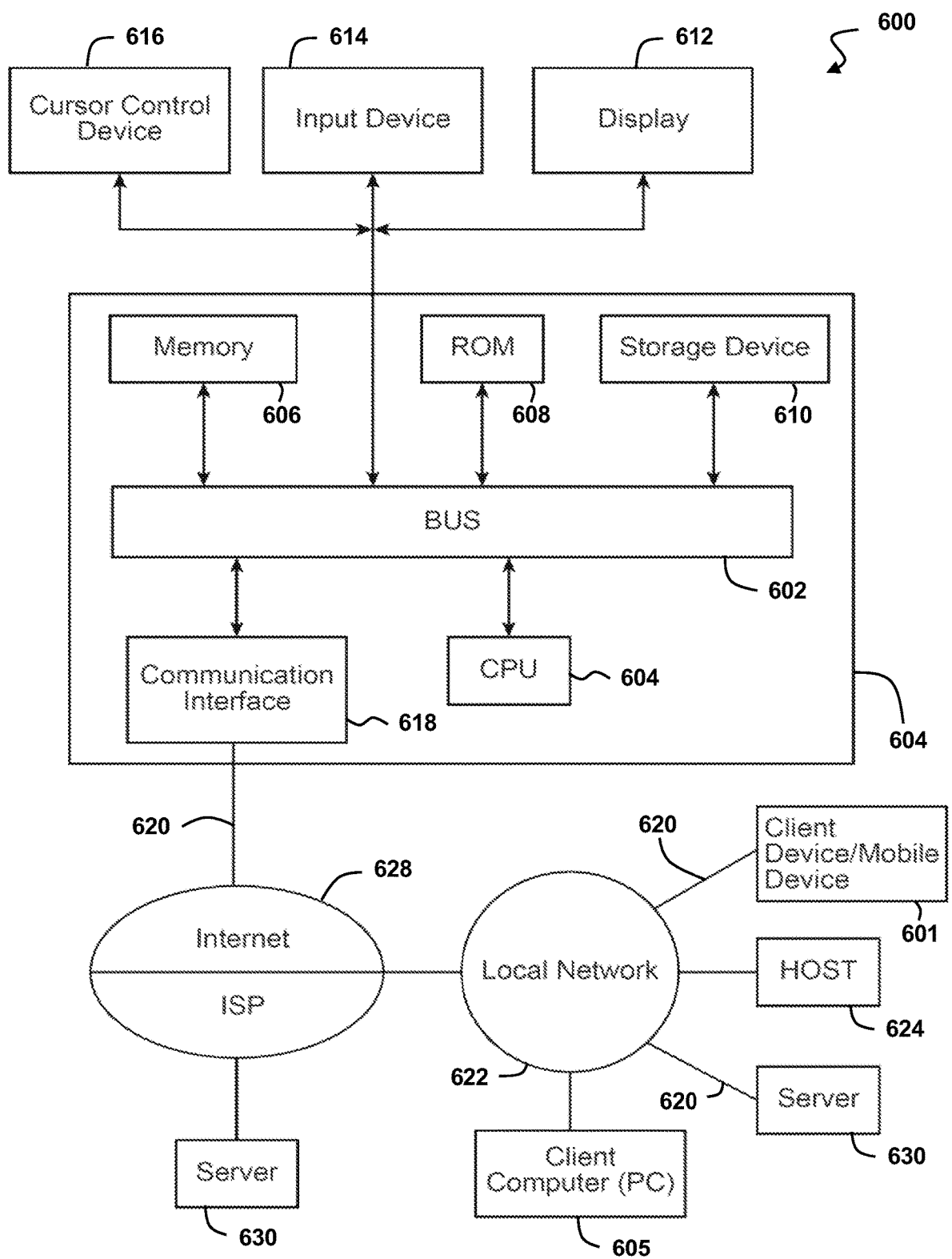
FIG. 17 shows a block diagram and process of an exemplary system in which an embodiment may be implemented.

FIG. 17 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630.

The system 600 can further include computers (e.g., personal computers, computing nodes) 605 operating in the same manner as client devices 601, where a user can utilize one or more computers 605 to manage data in the server 630.

Figure 18:
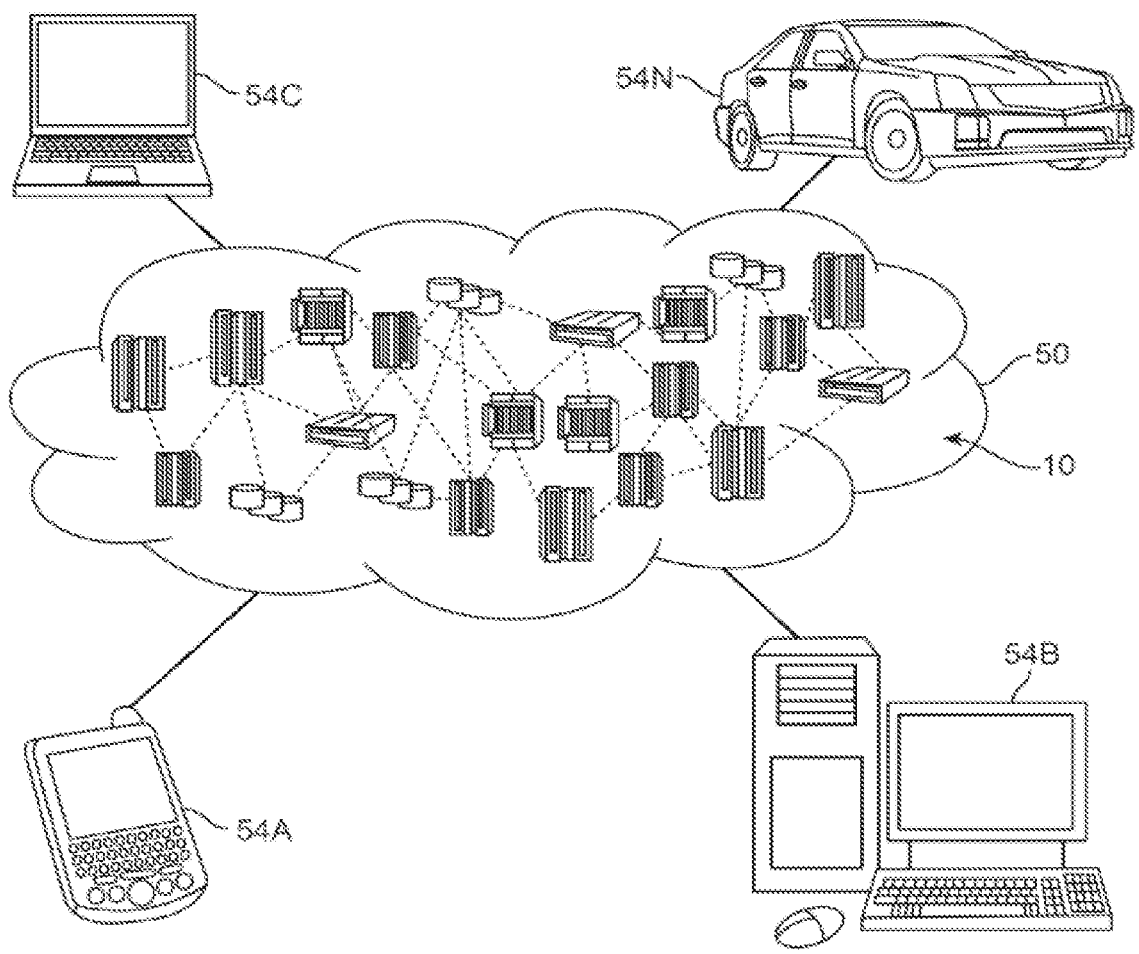
FIG. 18 depicts a cloud computing environment for implementing an embodiment of the system and process disclosed herein.

Referring now to FIG. 18, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 10 and cloud computing environment 50 can communicate with any type of computerized device over any type of network and/or network addressable connection (e.g., using a web browser).

Figure 19:
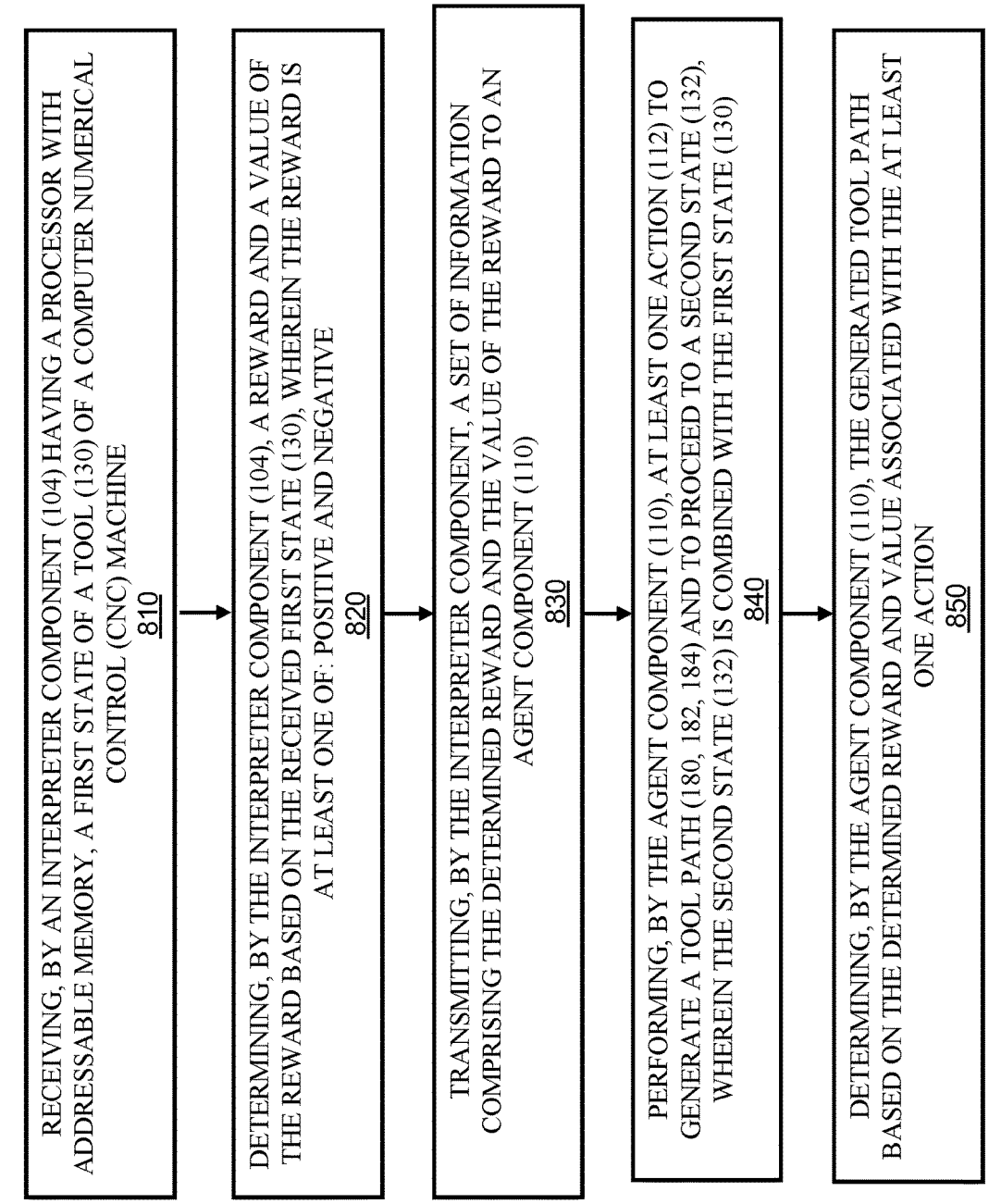
FIG. 19 depicts, in a top-level flowchart, an exemplary method of the disclosed embodiments.

The above disclosed embodiments may include an exemplary method of determining a machining toolpath, as illustrated in a top-level flowchart of FIG. 19. The exemplary steps may comprise the following steps: (a) receiving, by an interpreter component (104) having a processor with addressable memory, a first state of a tool (130) of a computer numerical control (CNC) machine (step 810); (b) determining, by the interpreter component (104), a reward and a value of the reward based on the received first state (130), wherein the reward is at least one of: positive and negative (step 820); (c) transmitting, by the interpreter component, a set of information comprising the determined reward and the value of the reward to an agent component (110) (step 830); (d) performing, by the agent component (110), at least one action (112) to generate a tool path (180, 182, 184) and to proceed to a second state (132), wherein the second state (132) is combined with the first state (130) (step 840); and (e) determining, by the agent component (110), the generated tool path based on the determined reward and value associated with the at least one action (step 850). Optionally, the method may further include: (f) wherein the at least one action (112) is determined based on at least one of: changing the tool, moving the tool, turning a spindle on, and turning the spindle off (step 860).

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:
receiving, by an interpreter logic of a computing device having a processor and addressable memory, a first state of a tool of a computer numerical control (CNC) machine;
determining, by the interpreter logic, a reward and a value of the reward based on the received first state, wherein the reward is at least one of: positive and negative;
transmitting, by the interpreter logic to an agent logic of the computing device, a set of information comprising the determined reward and the value of the reward and the received first state;
performing, by the agent logic, at least one action as part of generating a tool path, wherein the at least one action is limited by a policy comprising data for a set of possible actions available to the CNC machine, wherein the policy is at least one of: avoiding a collision and avoiding a part violation in manufacturing of the part;
creating, by the agent logic, a subsequent state to proceed to based on the performed at least one action, the subsequent state being a second state, and wherein the second state is combined with the first state;
determining, by the agent logic, a series of actions for the tool path until a final state is reached, based on the determined reward and value associated with the performed at least one action at each subsequent state;
training manufacturing machinery within a virtual environment based on reinforcement learning to determine the series of actions for the tool path; and
wherein each action of the series of actions is determined based on at least one of: changing the tool, moving the tool, turning a spindle on, and turning the spindle off.

2. The method of claim 1, wherein the first state comprises information regarding at least one of: state of the cutting tool, state of the machine, and both state of the cutting tool and state of the machine making up an overall system.

3. The method of claim 2, wherein the overall system is represented by at least one of: a cutting insert, a discrete part, a cutting tool, and a stock material.

4. The method of claim 1, wherein the at least one action comprises at least one of: turning operations, milling operations, additive Directed Energy Deposition (DED), wire Electrical discharge machining (EDM), and an additive powder bed.

5. A computing device having a processor and memory, the computing device configured to:
receive a first state of a tool of a computer numerical control (CNC) machine;
determine a reward and a value of the reward based on the received first state, wherein the reward is at least one of: positive and negative;
perform at least one action as part of generating a tool path, wherein the at least one action is limited by a policy comprising data for a set of possible actions available to the CNC machine, wherein the policy is at least one of: avoiding a collision and avoiding a part violation in manufacturing of the part;

proceed to a subsequent state based on the performed at least one action, the subsequent state being a second state, wherein the second state is combined with the first state;

determine, a series of actions for the tool path until a final state is reached, based on the determined reward and value associated with the performed at least one action at each subsequent state;

train manufacturing machinery within a virtual environment based on reinforcement learning to determine the series of actions for the tool path; and wherein each action of the series of actions is determined based on at least one of: changing the tool, moving the tool, turning a spindle on, and turning the spindle off.

6. The computing device of claim 5, wherein the first state comprises information regarding at least one of: state of the cutting tool, state of the machine, and both state of the cutting tool and state of the machine making up an overall system.

7. The computing device of claim 6, wherein the overall system is represented by at least one of: a cutting insert, a discrete part, a cutting tool, and a stock material.

8. The computing device of claim 5, wherein the at least one action comprises at least one of: turning operations, milling operations, additive Directed Energy Deposition (DED), wire Electrical discharge machining (EDM), and an additive powder bed.

9. A computer-aided manufacturing (CAM) system of a computer numerical control (CNC) machine comprising a computing device, wherein the computing device comprising an interpreter logic, an agent logic, and a policy logic;

wherein the interpreter logic of the computing device is configured to:

receive a first state of a tool of the CNC machine;

determine a reward and a value of the reward based on the received first state, wherein the reward is at least one of: positive and negative;

transmit a set of information comprising the determined reward and the value of the reward to the agent logic of the computing device; and wherein the agent logic of the computing device is configured to:

perform at least one action to generate a tool path, receive a policy from the policy logic, wherein the at least one action is limited by the policy and the policy comprises data for a set of possible actions available to the CNC machine, wherein the policy is at least one of: avoiding a collision and avoiding a part violation in manufacturing of the part;

proceed to a subsequent state based on the performed at least one action, the subsequent state being a second state, wherein the second state is combined with the first state;

determine a series of actions for the tool path until a final state is reached, based on the determined reward and value associated with the performed at least one action at each subsequent state;

train manufacturing machinery within a virtual environment based on reinforcement learning to determine the series of actions for the tool path; and wherein each action of the series of actions is determined based on at least one of: changing the tool, moving the tool, turning a spindle on, and turning the spindle off.

10. The system of claim 9, wherein a state of a tool of a computer numerical control (CNC) machine is a representation of a virtual environment.

11. The system of claim 10, wherein the virtual environment comprises a target, a stock, and a cutting tool.

12. The system of claim 11, wherein the final state is based on at least one of: no stock is left to be machined, no target is empty and thus to be added, and number of trials or iterations that have been performed is greater than a previously determined threshold.

13. The system of claim 9, wherein the policy limits the at least one action based on a set of fixed rules.

14. The system of claim 9, wherein the agent logic of the computing device if further configured to choose a subsequent action as a function of a history of a previously performed set of actions.

15. The system of claim 9, wherein the virtual environment for reinforcement learning in manufacturing utilizes a continuous, non-discretized, contour-based environment.

* * * * *